(12) United States Patent
Meadows et al.

(10) Patent No.: US 10,473,233 B2
(45) Date of Patent: Nov. 12, 2019

(54) ACTUATOR FOR SLIDE VALVES

(71) Applicant: TapcoEnpro, LLC, Channelview, TX (US)

(72) Inventors: Jeremy Lynn Meadows, Kingwood, TX (US); Eric Dewayne McCorkle, Channelview, TX (US)

(73) Assignee: TapcoEnpro, LLC, Channelview, TX (US)

( * ) Notice: Subject to any disclaimer, the term of this patent is extended or adjusted under 35 U.S.C. 154(b) by 72 days.

(21) Appl. No.: 15/716,798

(22) Filed: Sep. 27, 2017

(65) Prior Publication Data

US 2019/0093789 A1 Mar. 28, 2019

(51) Int. Cl.
| | |
|---|---|
| *F16K 31/53* | (2006.01) |
| *F16K 31/143* | (2006.01) |
| *F16K 3/02* | (2006.01) |
| *F16K 37/00* | (2006.01) |
| *F16K 31/14* | (2006.01) |
| *F16K 3/00* | (2006.01) |
| *F16K 27/00* | (2006.01) |

(52) U.S. Cl.
CPC ............ *F16K 31/53* (2013.01); *F16K 3/00* (2013.01); *F16K 3/0254* (2013.01); *F16K 27/003* (2013.01); *F16K 31/14* (2013.01); *F16K 31/143* (2013.01); *F16K 37/0016* (2013.01)

(58) Field of Classification Search
CPC . F16K 31/53; F16K 31/14; F16K 3/00; F16K 27/003; F16K 31/52; F16K 31/524; F16K 31/143; Y10T 74/19735
See application file for complete search history.

(56) References Cited

U.S. PATENT DOCUMENTS

| 3,677,108 A | * | 7/1972 | Prikryl | .................. F16K 31/143 |
| | | | | 251/229 |
| 3,842,690 A | * | 10/1974 | Gulick | .................... F15B 13/10 |
| | | | | 251/14 |
| 4,023,431 A | * | 5/1977 | Pavlas | .................. F16K 31/143 |
| | | | | 74/424.94 |
| 4,080,844 A | * | 3/1978 | Killian | ................ F16H 25/2025 |
| | | | | 74/89.38 |

(Continued)

FOREIGN PATENT DOCUMENTS

| KR | 200409040 Y1 | * | 2/2006 |
| KR | 101028505 B1 | * | 4/2011 |

*Primary Examiner* — Marina A Tietjen
(74) *Attorney, Agent, or Firm* — Michael F. Krieger; Kirton McConkie

(57) ABSTRACT

Actuators for fluid catalytic cracking unit slide valves and similar valves are disclosed. The actuator frame is assembled by bolting, allowing for standardized configurations that permit stocking of parts and avoids prior art problems of dealing with actuators designed for each individual project, allowing for rapid assembly of new actuators on demand that suit each project by varying the incorporated components, as well as permitting for more-rapid servicing when necessary. Additionally, the instrumentation for the actuator is contained within the actuator frame, better protecting the instrumentation from damage such as from being struck. The actuator includes a new manual engagement system, providing for better engagement of manual controls to actuate the actuator and the accompanying valve when necessary.

20 Claims, 22 Drawing Sheets

(56) References Cited

U.S. PATENT DOCUMENTS

| | | | | |
|---|---|---|---|---|
| 4,189,950 A | * | 2/1980 | Killian | F16H 25/2025 |
| | | | | 74/89.38 |
| 5,477,752 A | * | 12/1995 | West | F16K 31/05 |
| | | | | 251/129.03 |
| 2013/0175463 A1 | * | 7/2013 | Burgess | F16K 31/041 |
| | | | | 251/129.03 |
| 2018/0328512 A1 | * | 11/2018 | Hill | F16K 27/105 |

* cited by examiner

ACTUATOR FOR SLIDE VALVES

BACKGROUND OF THE INVENTION

1. Field of the Invention

The present invention relates to slide valves for fluid catalytic cracking (FCC) units, and more particularly to an actuator for FCC slide valves.

2. Background and Related Art

The actuator is a key component for a fluid catalytic cracking unit's (FCCU) slide valve's proper operation and performance. Currently, most slide valves in the FCCU are hydraulically driven due to the actuation speed requirements and the requirement of a 100% redundant source of power for emergency shut down (ESD) operation, such as secondary ESD hydraulic accumulators. The actuator's requirements are clearly defined in the FCC licensor's and client's specifications and are common in the industry.

Existing actuators continue to have certain deficiencies. In many instances, instrumentation for the actuator is disposed external to the actuator, where it is subject to strikes that can damage the instrumentation. Typically, each actuator is custom designed and manufactured for each project, with the frame elements (side and end plates) welded together. Accordingly, design and manufacture of current actuators is more expensive, time-consuming, and involves significant machining. When such actuators are to be serviced, they are often subject to significant downtime since any replacement actuator/parts needs to be custom manufactured to match the specifications of the prior actuator.

Some existing actuators include a manual actuation element, such as a hand-operated wheel, that permit control of the actuator even when a powered component (e.g. hydraulic piston rod) is not functioning (such as when hydraulic seals need to be replaced). Existing designs utilize a clamshell-type jaw block to selectively transmit force from the hand-operated wheel to a traveling block. Unfortunately, the clamshell-type jaw block tends not to engage as well as might be desired. Accordingly, due to problems such as these, existing actuators fail to fully address all needs within the FCCU valve actuator industry.

BRIEF SUMMARY OF THE INVENTION

Implementation of the invention provides actuators for fluid catalytic cracking unit (FCCU) slide valves. The actuator frame is assembled by bolting, allowing for standardized configurations that permit stocking of parts and avoids prior art problems of dealing with actuators designed for each individual project, allowing for rapid assembly of new actuators on demand that suit each project by varying the incorporated components, as well as permitting for more-rapid servicing when necessary. Additionally, the instrumentation for the actuator is contained within the actuator frame, better protecting the instrumentation from damage such as from being struck. The actuator includes a new manual engagement system, providing for better engagement of manual controls to actuate the actuator and the accompanying valve when necessary.

According to certain implementations of the invention, an actuator for a FCCU slide valve includes a hand-operated wheel operatively connected to a threaded drive shaft such that turning the hand-operated wheel causes the threaded drive shaft to rotate and a traveling block having an engagement system encompassing the threaded drive shaft. The traveling block includes a manual engagement lever. The manual engagement lever may extend from a slot in a side of the actuator. The traveling block also includes a first engagement shaft extending from the manual engagement lever on a first side of the threaded drive shaft, the first engagement shaft being operatively engaged with a first cam. The traveling block also includes a second engagement shaft extending substantially parallel to the first engagement shaft on a second side of the threaded drive shaft, the second engagement shaft being operatively engaged with a second cam. An engagement shaft linkage Extends between the first engagement shaft and the second engagement shaft and is operative to translate a rotation of the first engagement shaft into a coordinated rotation of the second engagement shaft. The traveling block also includes a split nut having a first half disposed in the traveling block on the first side of the threaded drive shaft and a second half disposed in the traveling block on the second side of the threaded drive shaft.

The traveling block further includes a first cam follower extending from the first cam to the first half of the split nut and a second cam follower extending from the second cam to the second half of the split nut. Operating the manual engagement lever causes the first engagement shaft and the second engagement shaft to rotate, operating the first cam and the second cam to force the first half of the split nut and the second half of the split nut together around the threaded drive shaft or to release the first half of the split nut and the second half of the split nut from the threaded drive shaft.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

The first half and the second half of the split nut each have a threaded contact surface adopted to engage with a thread of the threaded drive shaft. The first half of the split nut and the second half of the split nut may move substantially linearly toward and away from each other without rotating relative to each other.

The manual engagement lever may be directly coupled to the first engagement shaft, whereby the manual engagement lever rotates around an axis of the first engagement shaft.

The threaded drive shaft may be a first threaded drive shaft, and the actuator may further include a second threaded drive shaft operatively connected to the hand-operated wheel such that turning the hand-operated wheel causes the second threaded drive shaft to rotate. The traveling block may further include a third cam operatively engaged with the first engagement shaft and linked by a third cam follower to a first half of an additional split nut located on a first side of the second threaded drive shaft. The traveling block may also include a fourth cam operatively engaged with the second engagement shaft and linked by a fourth cam follower to a second half of the additional split nut located on a second side of the second threaded drive shaft. Operating the manual engagement lever and causing the first engagement shaft and the second engagement shaft to rotate, may thus operate the third cam and the fourth cam to force the first half of the additional split nut and the second half of the additional split nut together around the second threaded drive shaft or to release the first half of the additional split nut and the second half of the additional split nut from the second threaded drive shaft.

The actuator may have a first side plate, a second side plate, a first end plate bolted to the first side plate and the second side plate, and a second end plate bolted to the first side plate and the second side plate. Any of the first side plate, the second side plate, the first end plate, or the second end plate can be individually replaced.

The actuator may further include a guide rail disposed on one of the first side plate or the second side plate, the guide rail serving to reduce rotation of the traveling block relative to the side plates. The actuator may further include a side plate slot disposed on one of the first side plate or the second side plate, the side plate slot serving to reduce rotation of the traveling block relative to the side plates. Instrumentation for the actuator may be disposed within a volume defined by the first and second side plates and the first and second end plates. The instrumentation disposed within the volume defined by the first and second side plates and the first and second end plates may be instrumentation such as a linear-displacement transducer, a hand-wheel engagement limit switch, an open limit switch, or a closed limit switch. The actuator may further include a piston rod attached to one side of the traveling block and a valve stem attached to an opposing side of the traveling block.

According to additional alternate implementations of the invention, an actuator for a FCCU slide valve includes a hand-operated wheel operatively connected to a first threaded drive shaft and a second threaded drive shaft such that turning the hand-operated wheel causes the first threaded drive shaft and the second threaded drive shaft to rotate and a traveling block having an engagement system encompassing the first threaded drive shaft and the second threaded drive shaft. The traveling block includes a manual engagement lever. The manual engagement lever may extend from a slot in a side of the actuator. The traveling block also includes a first engagement shaft extending from the manual engagement lever on a first side of the threaded drive shaft, the first engagement shaft being operatively engaged with a first cam and a second cam, and a second engagement shaft extending substantially parallel to the first engagement shaft on a second side of the threaded drive shaft, the second engagement shaft being operatively engaged with a third cam and a fourth cam. The traveling block also includes an engagement shaft linkage extending between the first engagement shaft and the second engagement shaft and being operative to translate a rotation of the first engagement shaft into a coordinated rotation of the second engagement shaft.

The traveling block further includes a first split nut having a first half disposed in the traveling block on the first side of the first threaded drive shaft and a second half disposed in the traveling block on the second side of the first threaded drive shaft. The traveling block also includes a second split nut having a first half disposed in the traveling block on the first side of the second threaded drive shaft and a second half disposed in the traveling block on the second side of the second threaded drive shaft.

The traveling block also includes a first cam follower extending from the first cam to the first half of the first split nut, a second cam follower extending from the third cam to the second half of the first split nut, a third cam follower extending from the second cam to the first half of the second split nut, and a fourth cam follower extending from the fourth cam to the second half of the second split nut. Operating the manual engagement lever causes the first engagement shaft and the second engagement shaft to rotate, operating the first, second, third, and fourth cams to force the first half of each of the first split nut the second split nut and the second half of each of the first split nut and the second split nut together around the first threaded drive shaft and the second threaded drive shaft or to release the first half of the split nut and the second half of the first split nut and the second split nut from the first and second threaded drive shafts.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

The first half and the second half of each split nut each comprise a threaded contact surface adopted to engage with a thread of one of the threaded drive shafts. The first half of each split nut and the second half of each split nut may move substantially linearly toward and away from each other without rotating relative to each other.

The manual engagement lever may be directly coupled to the first engagement shaft, whereby the manual engagement lever rotates around an axis of the first engagement shaft. The actuator may further include a piston rod attached to one side of the traveling block and a valve stem attached to an opposing side of the traveling block.

The actuator may further include a first side plate, a second side plate, a first end plate bolted to the first side plate and the second side plate, and a second end plate bolted to the first side plate and the second side plate. Any of the first side plate, the second side plate, the first end plate, or the second end plate can be individually replaced.

According to additional alternate implementations of the invention, an actuator for a FCCU slide valve, includes a first side plate, a second side plate, a first end plate bolted to the first side plate and the second side plate, and a second end plate bolted to the first side plate and the second side plate. The actuator also includes a hand-operated wheel operatively connected to a first threaded drive shaft and a second threaded drive shaft such that turning the hand-operated wheel causes the first threaded drive shaft and the second threaded drive shaft to rotate and a traveling block having an engagement system encompassing the first threaded drive shaft and the second threaded drive shaft. The traveling block includes a manual engagement lever, which may extend through a slot in one of the side plates of the actuator.

A first engagement shaft extends from the manual engagement lever on a first side of the first threaded drive shaft and on a first side of the second threaded drive shaft. The first engagement shaft is operatively engaged with a first cam and a second cam. A second engagement shaft extends substantially parallel to the first engagement shaft on a second side of the first threaded drive shaft and on a second side of the second threaded drive shaft. The second engagement shaft is operatively engaged with a third cam and a fourth cam. An engagement shaft linkage extends between the first engagement shaft and the second engagement shaft and is operative to translate a rotation of the first engagement shaft into a coordinated rotation of the second engagement shaft.

The traveling block further includes a first split nut having a first half disposed in the traveling block on the first side of the first threaded drive shaft and a second half disposed in the traveling block on the second side of the first threaded drive shaft. The traveling block also includes a second split nut having a first half disposed in the traveling block on the first side of the second threaded drive shaft and a second half disposed in the traveling block on the second side of the second threaded drive shaft.

A first cam follower extends from the first cam to the first half of the first split nut. A second cam follower extends from the third cam to the second half of the first split nut. A third cam follower extends from the second cam to the first half of the second split nut. A fourth cam follower extends from the fourth cam to the second half of the second split nut. Operating the manual engagement lever causes the first engagement shaft and the second engagement shaft to rotate, operating the first, second, third, and fourth cams to force the first half and the second half of the first split nut together around the first threaded drive shaft and to force the first half and the second half of the second split nut together around the second threaded drive shaft or to release the first half and the second half of the respective split nuts from the respective threaded drive shafts.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

The foregoing described implementations are intended to give a summary of features of implementations of the invention and are not intended to be limiting. Further attention should be provided to the depictions in the drawings and the detailed description below to further understand implementations of the invention. The scope of the invention is defined in the appended claims.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
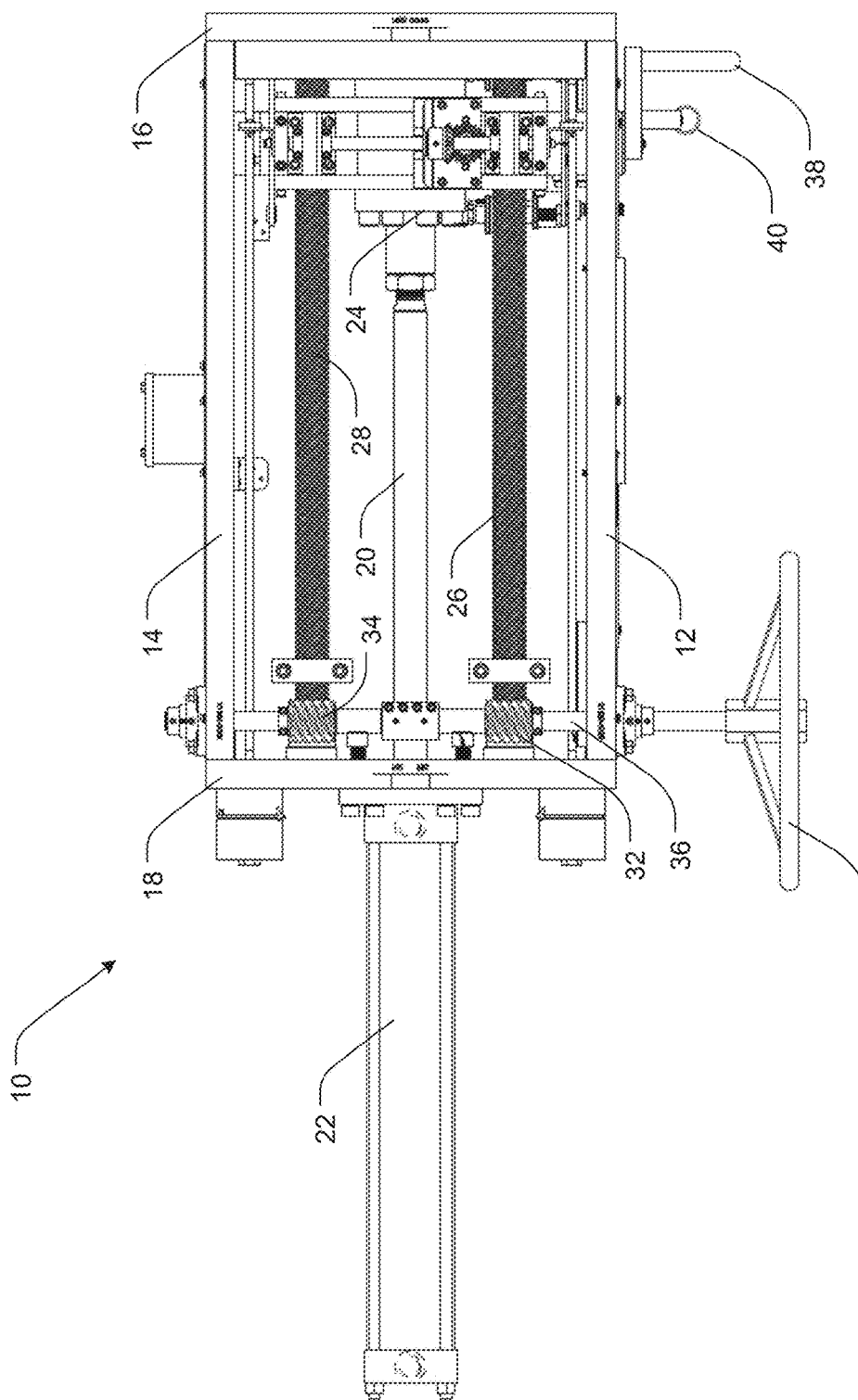
FIG. 1 shows a top view of one embodiment of an actuator.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide actuators for fluid catalytic cracking unit (FCCU) slide valves. The actuator frame is assembled by bolting, allowing for standardized configurations that permit stocking of parts and avoids prior art problems of dealing with actuators designed for each individual project, allowing for rapid assembly of new actuators on demand that suit each project by varying the incorporated components, as well as permitting for more-rapid servicing when necessary. Additionally, the instrumentation for the actuator is contained within the actuator frame, better protecting the instrumentation from damage such as from being struck. The actuator includes a new manual engagement system, providing for better engagement of manual controls to actuate the actuator and the accompanying valve when necessary.

According to certain embodiments of the invention, an actuator for a FCCU slide valve includes a hand-operated wheel operatively connected to a threaded drive shaft such that turning the hand-operated wheel causes the threaded drive shaft to rotate and a traveling block having an engagement system encompassing the threaded drive shaft. The traveling block includes a manual engagement lever. The manual engagement lever may extend from a slot in a side of the actuator. The traveling block also includes a first engagement shaft extending from the manual engagement lever on a first side of the threaded drive shaft, the first engagement shaft being operatively engaged with a first cam. The traveling block also includes a second engagement shaft extending substantially parallel to the first engagement shaft on a second side of the threaded drive shaft, the second engagement shaft being operatively engaged with a second cam. An engagement shaft linkage Extends between the first engagement shaft and the second engagement shaft and is operative to translate a rotation of the first engagement shaft into a coordinated rotation of the second engagement shaft. The traveling block also includes a split nut having a first half disposed in the traveling block on the first side of the threaded drive shaft and a second half disposed in the traveling block on the second side of the threaded drive shaft.

The traveling block further includes a first cam follower extending from the first cam to the first half of the split nut and a second cam follower extending from the second cam to the second half of the split nut. Operating the manual engagement lever causes the first engagement shaft and the second engagement shaft to rotate, operating the first cam and the second cam to force the first half of the split nut and the second half of the split nut together around the threaded drive shaft or to release the first half of the split nut and the second half of the split nut from the threaded drive shaft.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

The first half and the second half of the split nut each have a threaded contact surface adopted to engage with a thread of the threaded drive shaft. The first half of the split nut and the second half of the split nut may move substantially linearly toward and away from each other without rotating relative to each other.

The manual engagement lever may be directly coupled to the first engagement shaft, whereby the manual engagement lever rotates around an axis of the first engagement shaft.

The threaded drive shaft may be a first threaded drive shaft, and the actuator may further include a second threaded drive shaft operatively connected to the hand-operated wheel such that turning the hand-operated wheel causes the second threaded drive shaft to rotate. The traveling block may further include a third cam operatively engaged with the first engagement shaft and linked by a third cam follower to a first half of an additional split nut located on a first side of the second threaded drive shaft. The traveling block may also include a fourth cam operatively engaged with the second engagement shaft and linked by a fourth cam follower to a second half of the additional split nut located on a second side of the second threaded drive shaft. Operating the manual engagement lever and causing the first engagement shaft and the second engagement shaft to rotate, may thus operate the third cam and the fourth cam to force the first half of the additional split nut and the second half of the additional split nut together around the second threaded drive shaft or to release the first half of the additional split nut and the second half of the additional split nut from the second threaded drive shaft.

The actuator may have a first side plate, a second side plate, a first end plate bolted to the first side plate and the second side plate, and a second end plate bolted to the first side plate and the second side plate. Any of the first side plate, the second side plate, the first end plate, or the second end plate can be individually replaced.

The actuator may further include a guide rail disposed on one of the first side plate or the second side plate, the guide rail serving to reduce rotation of the traveling block relative to the side plates. The actuator may further include a side plate slot disposed on one of the first side plate or the second side plate, the side plate slot serving to reduce rotation of the traveling block relative to the side plates. Instrumentation for the actuator may be disposed within a volume defined by the first and second side plates and the first and second end plates. The instrumentation disposed within the volume defined by the first and second side plates and the first and second end plates may be instrumentation such as a linear-displacement transducer, a hand-wheel engagement limit switch, an open limit switch, or a closed limit switch. The actuator may further include a piston rod attached to one side of the traveling block and a valve stem attached to an opposing side of the traveling block.

According to additional alternate embodiments of the invention, an actuator for a FCCU slide valve includes a hand-operated wheel operatively connected to a first threaded drive shaft and a second threaded drive shaft such that turning the hand-operated wheel causes the first threaded drive shaft and the second threaded drive shaft to rotate and a traveling block having an engagement system encompassing the first threaded drive shaft and the second threaded drive shaft. The traveling block includes a manual engagement lever. The manual engagement lever may extend from a slot in a side of the actuator. The traveling block also includes a first engagement shaft extending from the manual engagement lever on a first side of the threaded drive shaft, the first engagement shaft being operatively engaged with a first cam and a second cam, and a second engagement shaft extending substantially parallel to the first engagement shaft on a second side of the threaded drive shaft, the second engagement shaft being operatively engaged with a third cam and a fourth cam. The traveling block also includes an engagement shaft linkage extending between the first engagement shaft and the second engagement shaft and being operative to translate a rotation of the first engagement shaft into a coordinated rotation of the second engagement shaft.

The traveling block further includes a first split nut having a first half disposed in the traveling block on the first side of the first threaded drive shaft and a second half disposed in the traveling block on the second side of the first threaded drive shaft. The traveling block also includes a second split nut having a first half disposed in the traveling block on the first side of the second threaded drive shaft and a second half disposed in the traveling block on the second side of the second threaded drive shaft.

The traveling block also includes a first cam follower extending from the first cam to the first half of the first split nut, a second cam follower extending from the third cam to the second half of the first split nut, a third cam follower extending from the second cam to the first half of the second split nut, and a fourth cam follower extending from the fourth cam to the second half of the second split nut. Operating the manual engagement lever causes the first engagement shaft and the second engagement shaft to rotate, operating the first, second, third, and fourth cams to force the first half of each of the first split nut the second split nut and the second half of each of the first split nut and the second split nut together around the first threaded drive shaft and the second threaded drive shaft or to release the first half of the split nut and the second half of the first split nut and the second split nut from the first and second threaded drive shafts.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

The first half and the second half of each split nut each comprise a threaded contact surface adopted to engage with a thread of one of the threaded drive shafts. The first half of each split nut and the second half of each split nut may move substantially linearly toward and away from each other without rotating relative to each other.

The manual engagement lever may be directly coupled to the first engagement shaft, whereby the manual engagement lever rotates around an axis of the first engagement shaft. The actuator may further include a piston rod attached to one side of the traveling block and a valve stem attached to an opposing side of the traveling block.

The actuator may further include a first side plate, a second side plate, a first end plate bolted to the first side plate and the second side plate, and a second end plate bolted to the first side plate and the second side plate. Any of the first side plate, the second side plate, the first end plate, or the second end plate can be individually replaced.

According to additional alternate embodiments of the invention, an actuator for a FCCU slide valve, includes a first side plate, a second side plate, a first end plate bolted to the first side plate and the second side plate, and a second end plate bolted to the first side plate and the second side plate. The actuator also includes a hand-operated wheel operatively connected to a first threaded drive shaft and a second threaded drive shaft such that turning the hand-operated wheel causes the first threaded drive shaft and the second threaded drive shaft to rotate and a traveling block having an engagement system encompassing the first threaded drive shaft and the second threaded drive shaft. The traveling block includes a manual engagement lever, which may extend through a slot in one of the side plates of the actuator.

A first engagement shaft extends from the manual engagement lever on a first side of the first threaded drive shaft and on a first side of the second threaded drive shaft. The first engagement shaft is operatively engaged with a first cam and a second cam. A second engagement shaft extends substantially parallel to the first engagement shaft on a second side of the first threaded drive shaft and on a second side of the second threaded drive shaft. The second engagement shaft is operatively engaged with a third cam and a fourth cam. An engagement shaft linkage extends between the first engagement shaft and the second engagement shaft and is operative to translate a rotation of the first engagement shaft into a coordinated rotation of the second engagement shaft.

The traveling block further includes a first split nut having a first half disposed in the traveling block on the first side of the first threaded drive shaft and a second half disposed in the traveling block on the second side of the first threaded drive shaft. The traveling block also includes a second split nut having a first half disposed in the traveling block on the first side of the second threaded drive shaft and a second half disposed in the traveling block on the second side of the second threaded drive shaft.

A first cam follower extends from the first cam to the first half of the first split nut. A second cam follower extends from the third cam to the second half of the first split nut. A third cam follower extends from the second cam to the first half of the second split nut. A fourth cam follower extends from the fourth cam to the second half of the second split nut. Operating the manual engagement lever causes the first engagement shaft and the second engagement shaft to rotate, operating the first, second, third, and fourth cams to force the first half and the second half of the first split nut together around the first threaded drive shaft and to force the first half and the second half of the second split nut together around the second threaded drive shaft or to release the first half and the second half of the respective split nuts from the respective threaded drive shafts.

The engagement shaft linkage may include a linkage shaft extending between the first engagement shaft and the second engagement shaft, a first bevel gear translating rotational motion of the first engagement shaft into rotational motion of the linkage shaft, and a second bevel gear translating rotational motion of the linkage shaft into rotational motion of the second engagement shaft.

Figure 2:
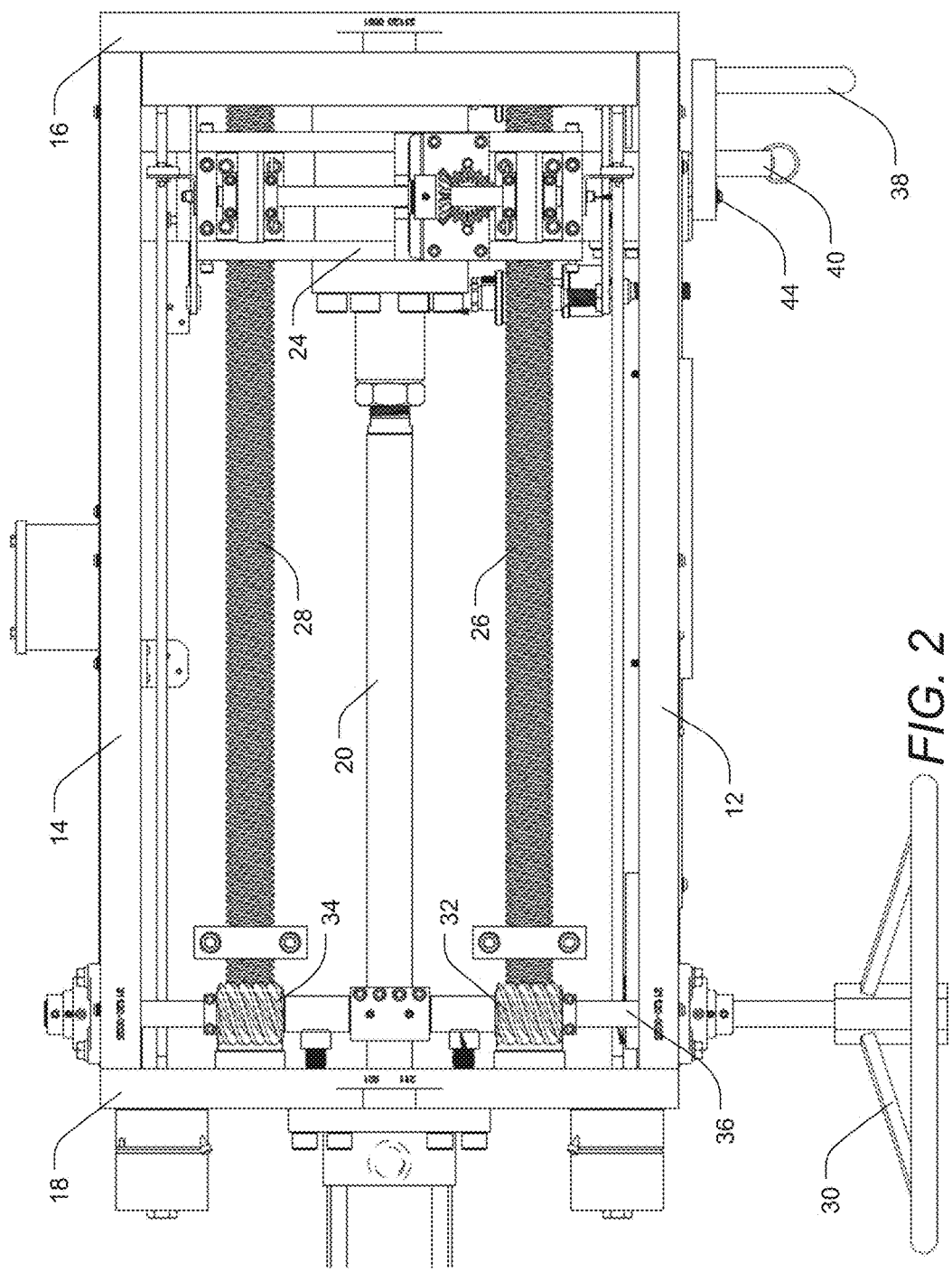
FIG. 2 shows a top view of a portion of the actuator of FIG. 1.
Figure 3:
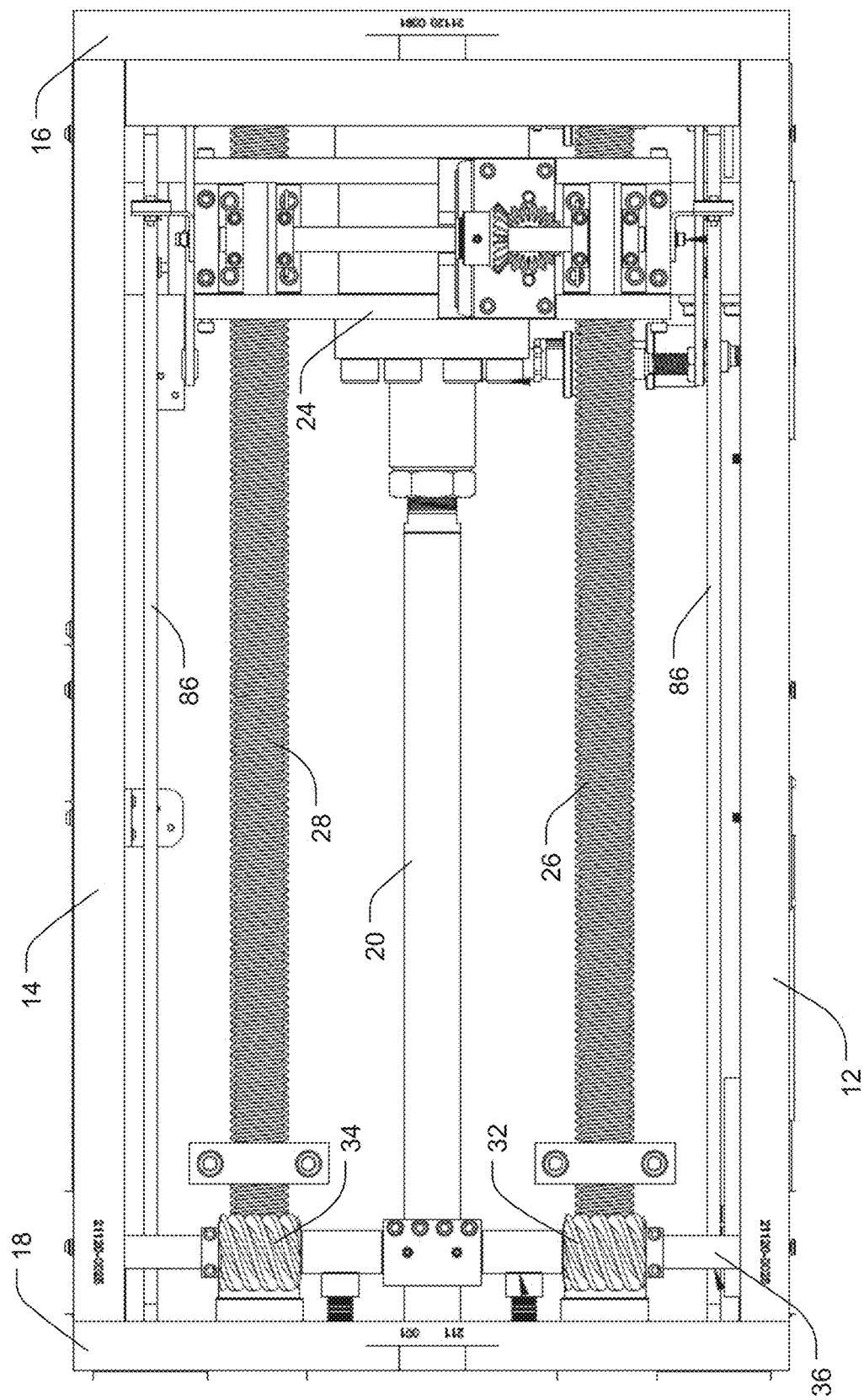
FIG. 3 shows a top view of a smaller portion of the actuator of FIG. 1.
Figure 4:
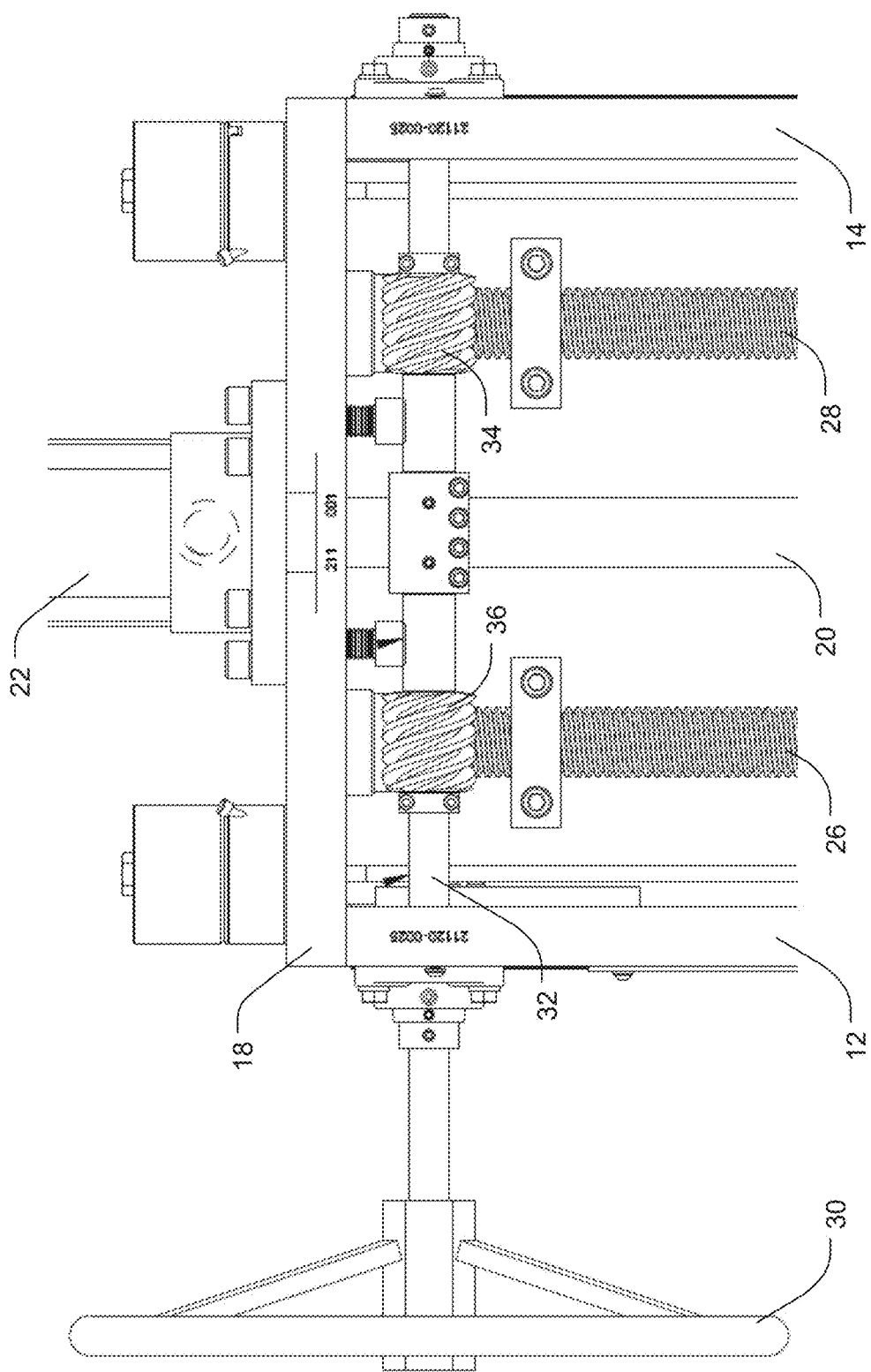
FIG. 4 shows a top view of a still-smaller portion of the actuator of FIG. 1.
Figure 5:
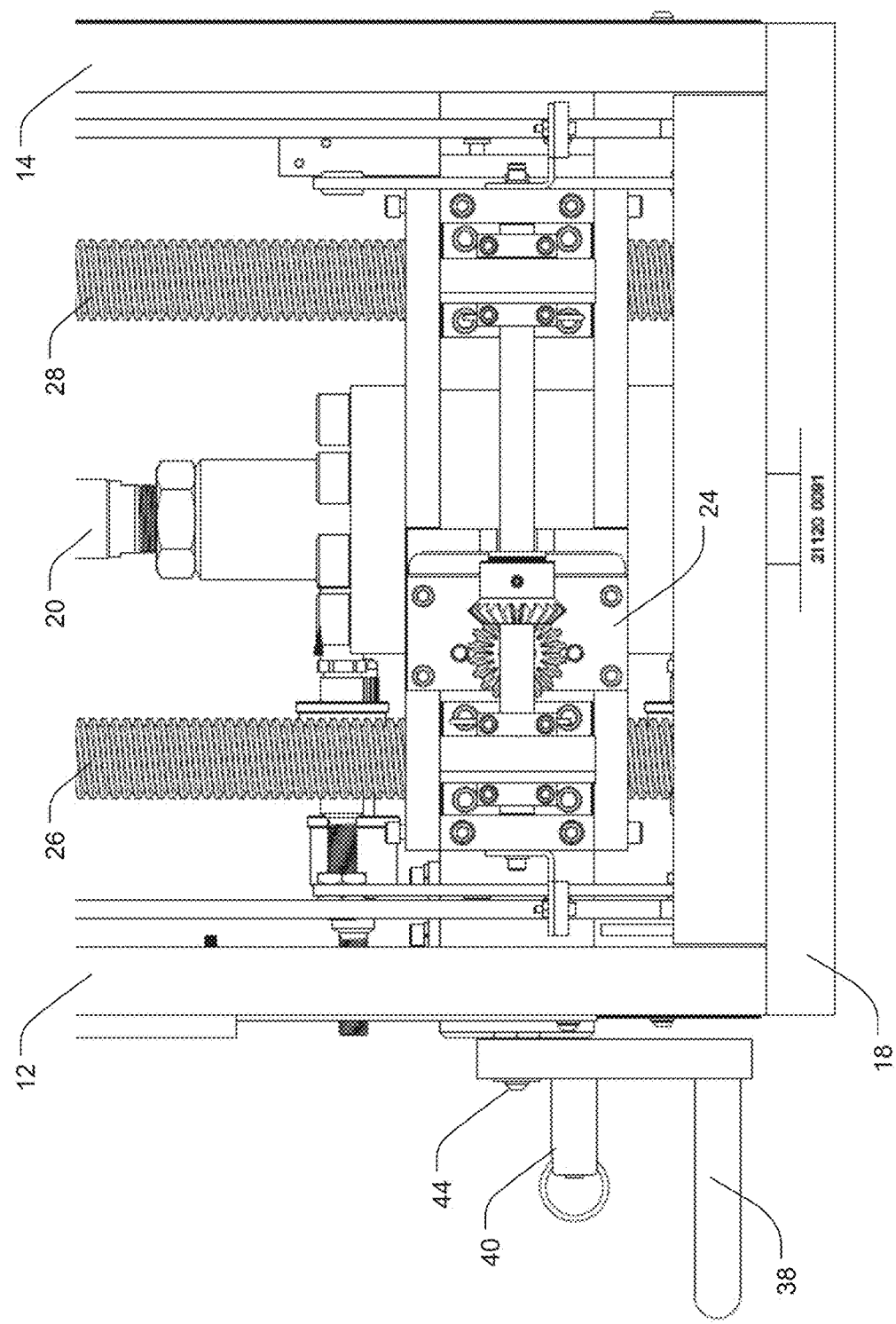
FIG. 5 shows a top view of another smaller portion of the actuator of FIG. 1.
Figure 6:
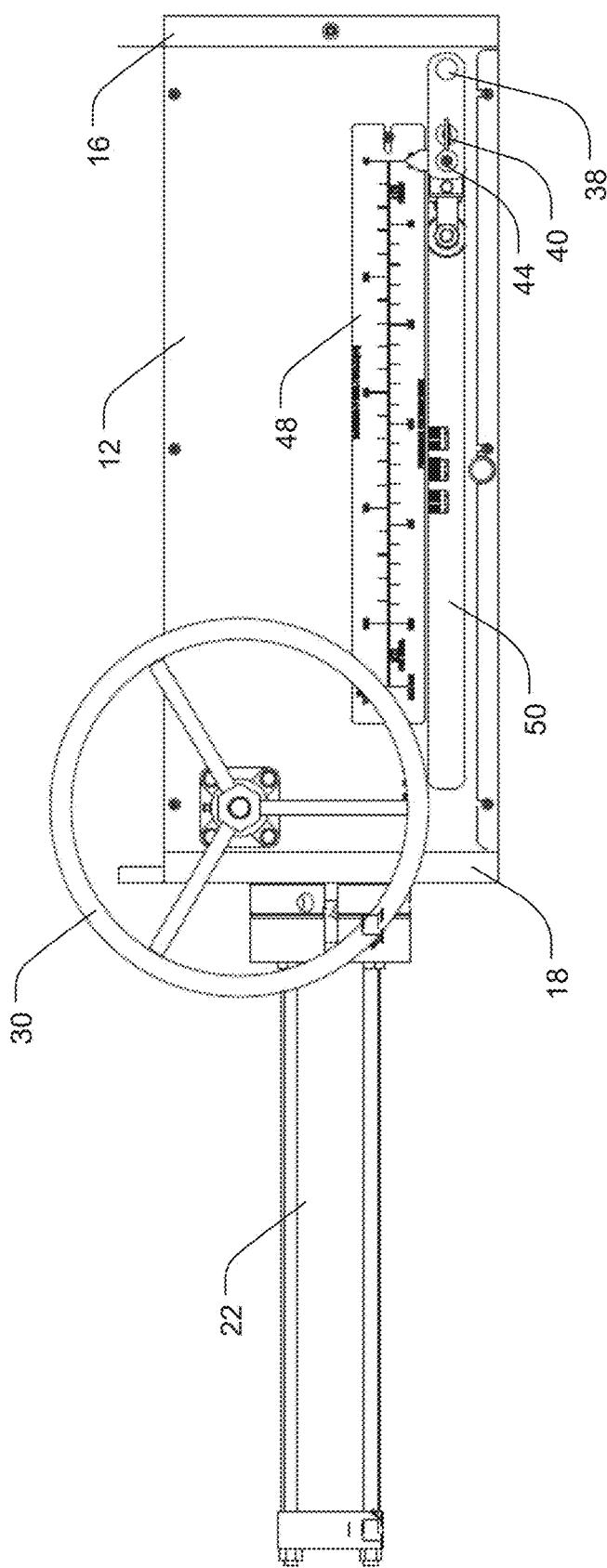
FIG. 6 shows a side view of the actuator of FIG. 1.
Figure 7:
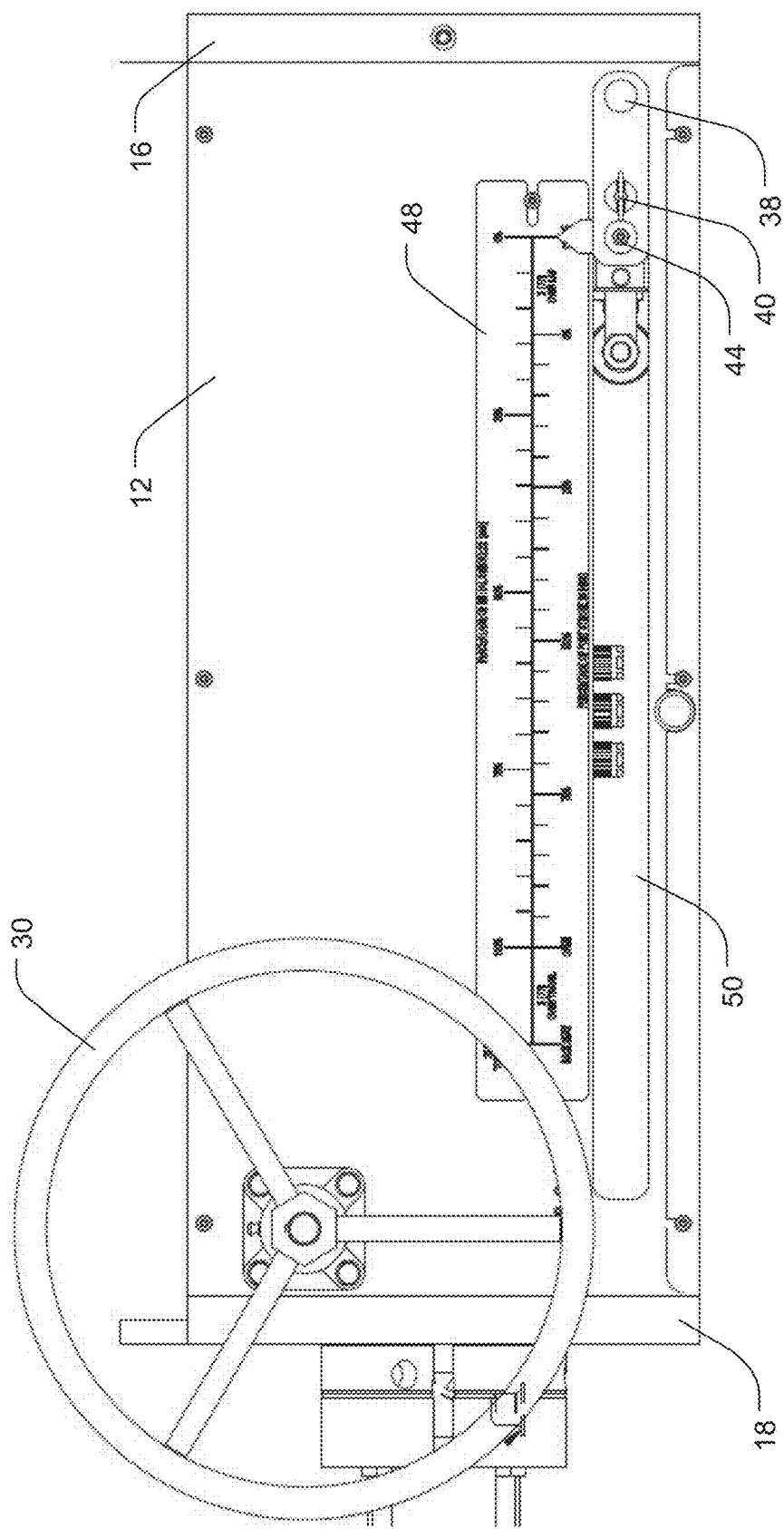
FIG. 7 shows a side view of a portion of the actuator of FIG. 1.
Figure 8:
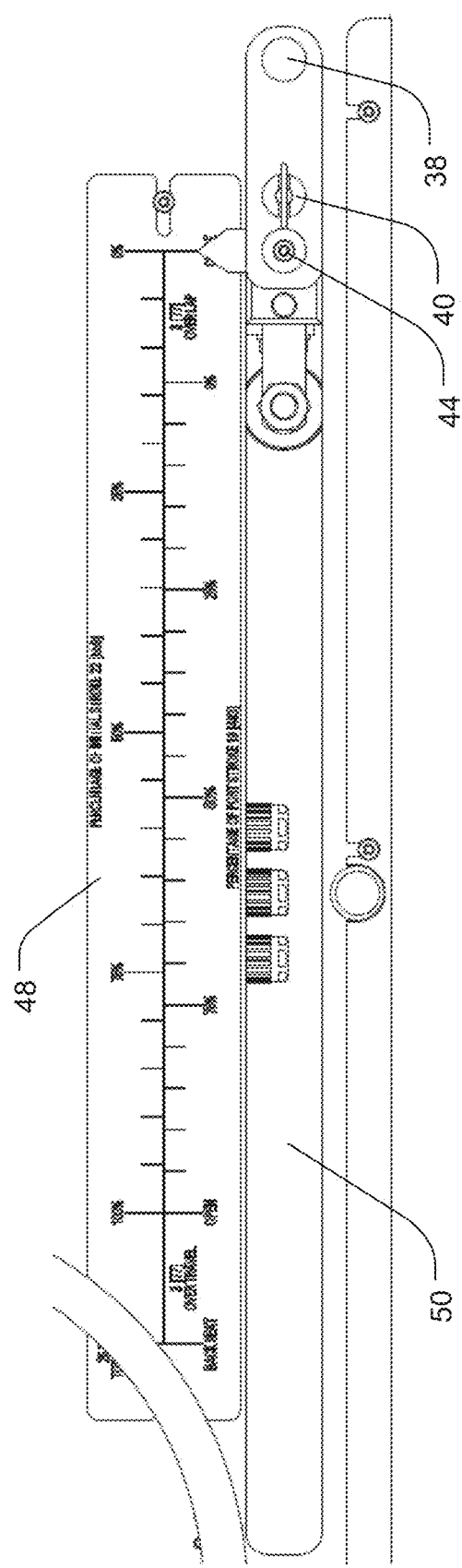
FIG. 8 shows a side view of a smaller portion of the actuator of FIG. 1.
Figure 9:
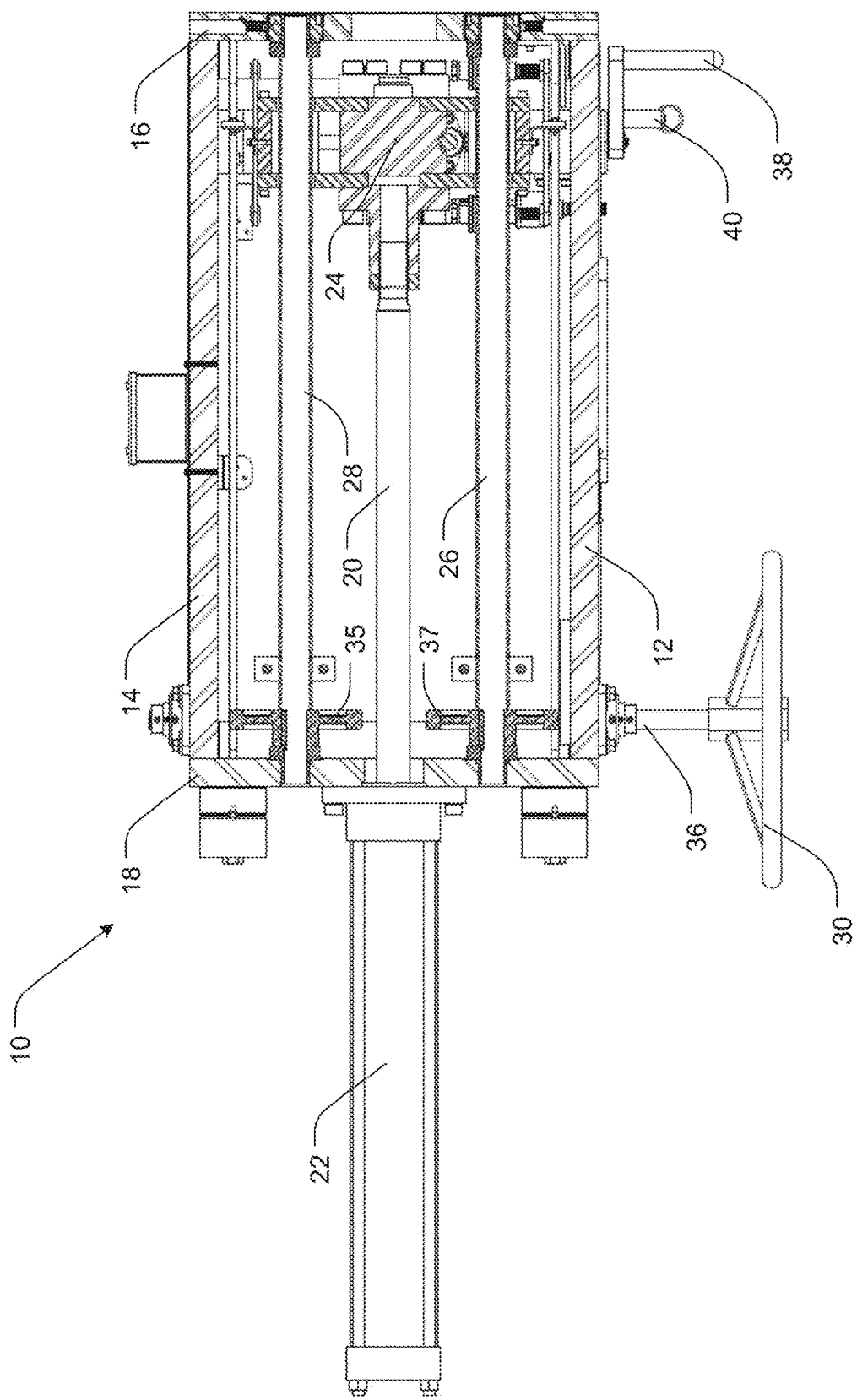
FIG. 9 shows a partial-cutaway top view of the actuator of FIG. 1.
Figure 10:
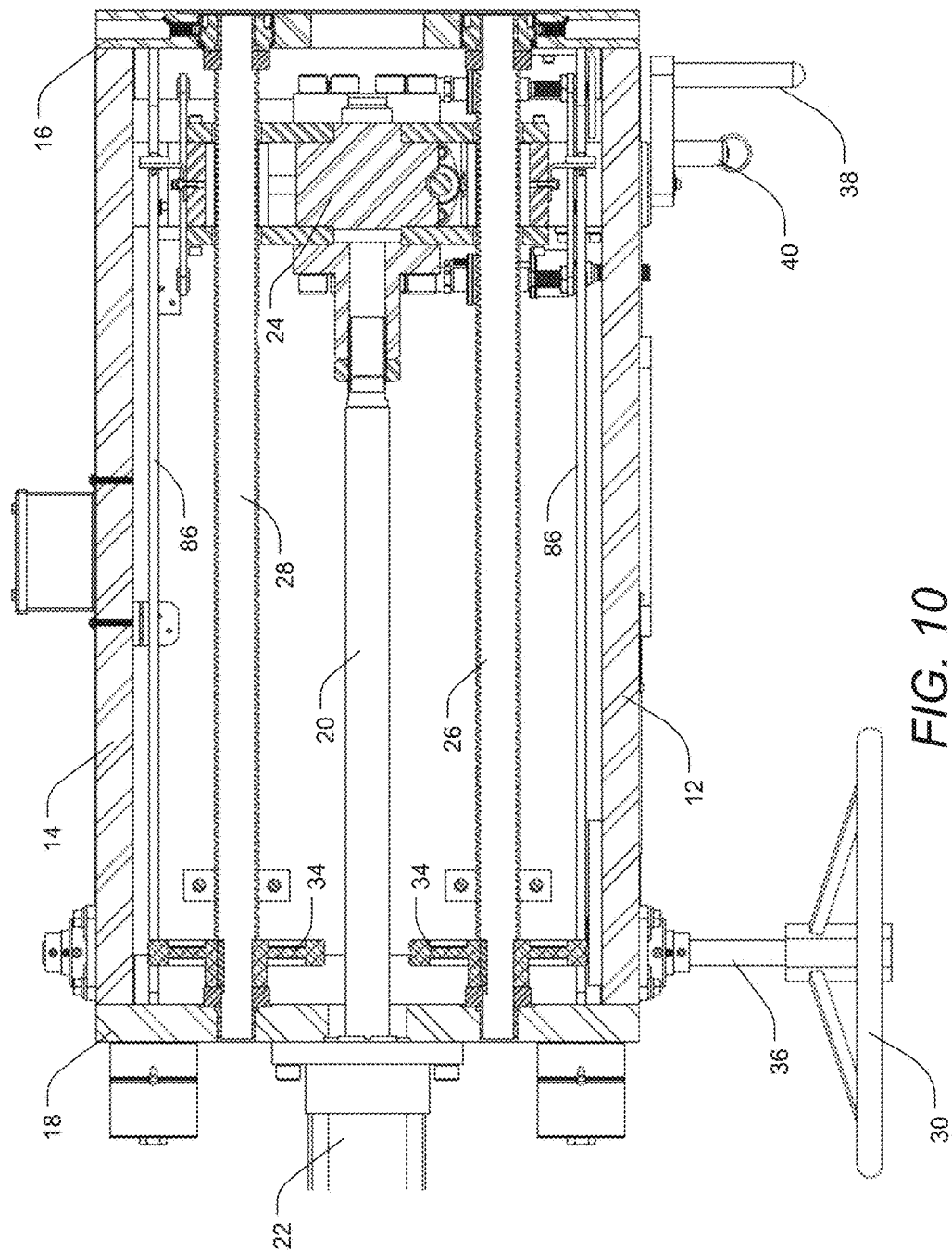
FIG. 10 shows a partial-cutaway top view of a portion of the actuator of FIG. 1.
Figure 11:
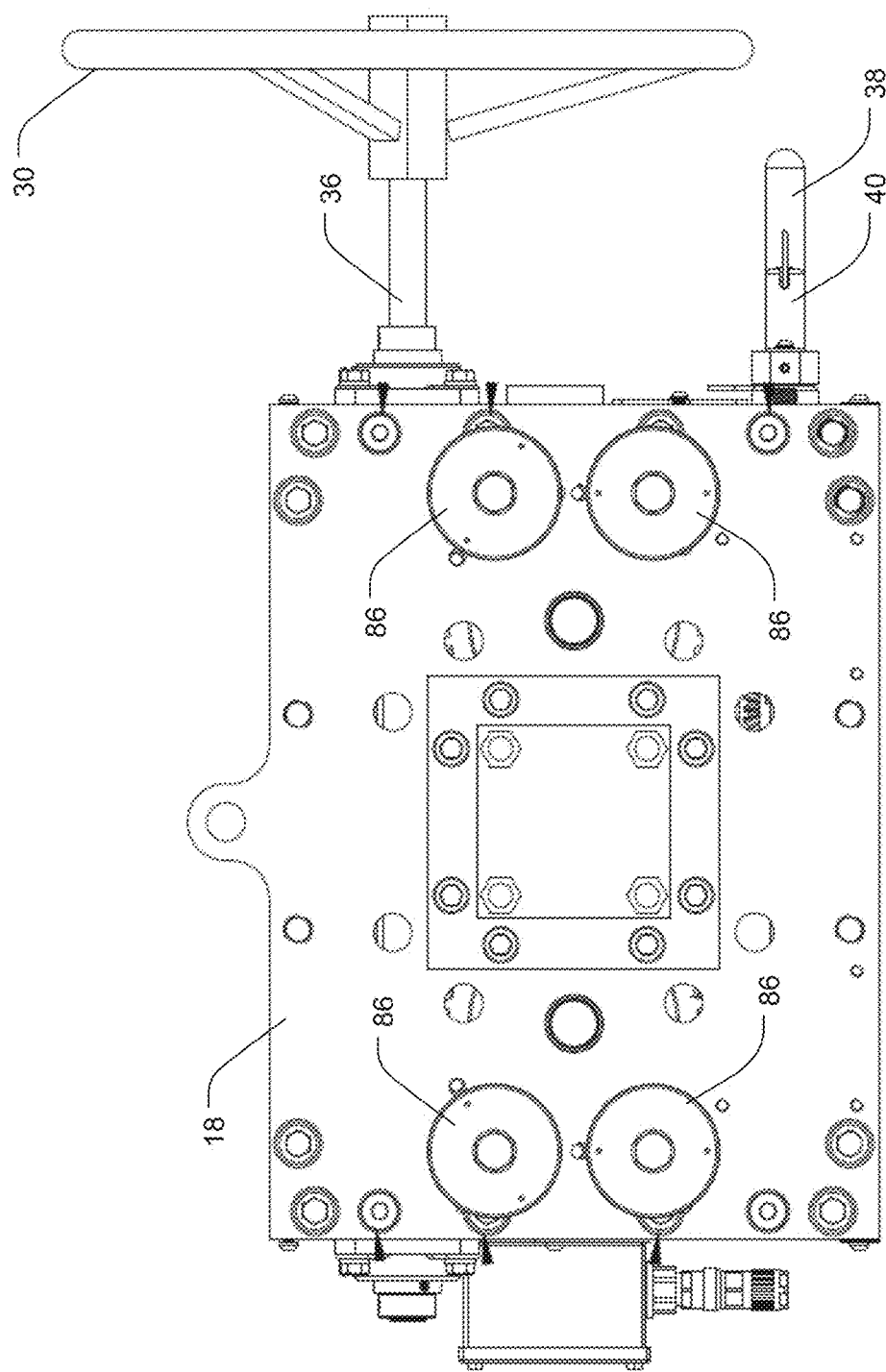
FIG. 11 shows a cylinder-end view of the actuator of FIG. 1, omitting the hydraulic cylinder.
Figure 12:
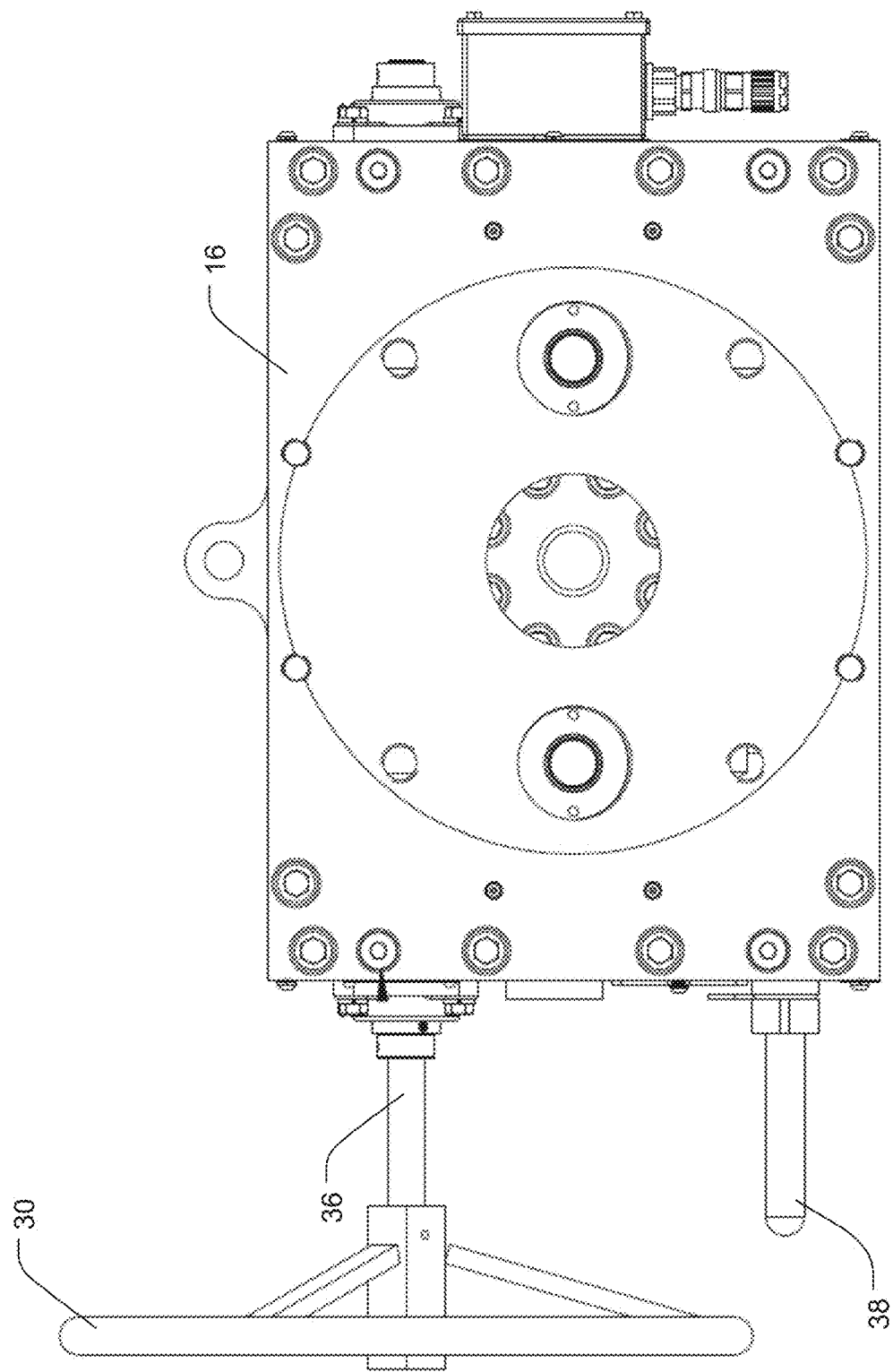
FIG. 12 shows a valve-end view of the actuator of FIG. 1.

FIG. 1 shows a top view of an exemplary actuator 10. (Naming this view a "top" view is for convenience of discussion only, as the actuator can be installed in any desired orientation, such that what is shown as the "top" in FIG. 1 could be oriented to the side or downward on installation.) FIG. 2 shows an enlarged top view of a portion of the actuator 10. FIG. 3 shows a further-enlarged top view of a smaller portion of the actuator 10. FIGS. 4 and 5 show further-enlarged top view of still smaller portions of the actuator 10. FIGS. 6-8 show side views of the actuator 10 and portions thereof. FIGS. 9 and 10 show top partial-cutaway views of the actuator 10 and a portion thereof. FIGS. 11 and 12 show cylinder and valve end views of the actuator 10, respectively.

The actuator 10 has a frame or body formed of a first side plate 12, a second side plate 14, a first end plate 16 bolted to the first side plate 12 and the second side plate 14, and a second end plate 18 bolted to the first side plate 12 and the second side plate 14 opposite the first end plate 16. Alternatively, a bolt may pass through channels in the first and second end plates 16, 18 and in the first and second side plates 12, 14, such that the bolts pass the entire length of the frame or body and are secured at either end of the frame or body. Because the frame or body is bolted together instead of being welded together as was previously ubiquitous in the art, the frame or body components may have a set number of standard sizes that may be selected to assemble the body of the actuator 10 to have desired characteristics. For example, if the actuator 10 is to have a longer throw, then a longer first side plate 12 and a longer second side plate 14 may be selected, along with longer other components (discussed in more detail below) to provide the longer throw.

Additionally, if the actuator is to be able to provide more force for closing and/or opening of the valve, the first end plate 16 and the second end plate 18 may be selected to have a larger opening to permit passage of a larger piston rod 20 and/or valve stem (not shown) capable of providing sufficient opening and/or closing force. On the other hand, if less opening and/or closing force is needed, a first end plate 16 and a second end plate 18 having smaller openings for the piston rod 20 and/or valve stem may be provided instead. Accordingly, for reasons such as these, a manufacturer can stock a few standard sizes of frame components and can assemble an actuator frame or body on demand in short order without having to individually machine and match parts to weld together an actuator frame or body, as was done previously.

The piston rod 20 may be hydraulically actuated, electro-hydraulically actuated, or electrically actuated, depending on the particular application and demands of the valve and actuator 10. Accordingly, the actuator may have a hydraulic cylinder barrel 22 and accompanying hydraulic lines, etc. (not shown) to drive the piston rod 20 toward and away from the valve (not shown) to which the actuator 10 is operatively attached. The piston rod 20 is affixed at its other end to one side of a traveling block 24, which is shown in more detail in FIGS. 5, 13, and 14. The other side of the traveling block 24 is adapted to be attached to a valve stem (not shown) when the actuator 10 is attached to its valve, as is known in the art.

The traveling block 24 passes over and encompasses a portion of a first threaded drive shaft 26 and a portion of a second threaded drive shaft 28. The first threaded drive shaft 26 and the second threaded drive shaft 28 are substantially coplanar with the piston rod 20, and are equally spaced on either side of the piston rod 20, to thereby be capable of transferring a balanced, equal force to the traveling block 24 so as to permit actuation of the valve without jamming, even when a powered or hydraulic force to actuate the valve (e.g. through the piston rod 20) is not available. When manual operation of the actuator (and valve) is desired, components of the traveling block 24 may be actuated to engage the first threaded drive shaft 26 and the second threaded drive shaft 28 (as will be discussed in more detail below), such that as the first threaded drive shaft 26 and the second threaded drive shaft 28 turn, the traveling block 24 is forced toward or away from the valve, thereby adjusting the valve.

The first threaded drive shaft 26 and the second threaded drive shaft 28 are operatively joined to and operated by a hand-operated wheel 30 by a first worm drive 32 and a second worm drive 34, respectively, on a worm drive shaft 36. (Associated worm gears 35, 37 are visible in the cutaway view of FIG. 9.) FIG. 4 shows a top view of the portion of the actuator 10 containing these features. As a user operates/turns the hand-operated wheel 30, it rotates the worm drive shaft 36, and the rotation of the worm drive shaft 36 is turned into coordinated rotation of the first threaded drive shaft 26 by the first worm drive 32 and of the second threaded drive shaft 28 by the second worm drive 34.

Permitting manual operation of the actuator 10 is an important safety feature of the actuator 10, but 99% of the time or greater, the actuator 10 will be used in automatic or powered mode, in which movement of the traveling block 24 will be achieved using the piston rod 20 (hydraulic, electro-hydraulic, or electric actuated), and accordingly, the traveling block 24 should not be engaged with the first threaded drive shaft 26 or the second threaded drive shaft 28 in normal operation, so that the first threaded drive shaft 26 and the second threaded drive shaft 28 do not need to turn in normal operation. Accordingly, the traveling block 24 includes features and components to engage and disengage from the first threaded drive shaft 26 and the second threaded drive shaft 28.

In prior actuators, a clamshell-type mechanism was used to engage a traveling block to a threaded drive shaft. The clamshell-type mechanism used two threaded halves that hinged together to encompass the sides of the drive shaft to engage the drive shaft's threads. This engagement mechanism was comparatively difficult to engage and did not engage as well or as securely as the engagement mechanism for the actuator 10 discussed in more detail below.

Accordingly, the traveling block 24 of the exemplary actuator 10 includes a new manual engagement mechanism, that is illustrated in the enlarged top view of FIG. 5. A manual engagement lever 38 extends from the traveling block 24 through a slot in the first side plate 12. The manual engagement lever 38 includes a release mechanism 40 (or locking mechanism) that normally locks against or prevents operation of the manual engagement lever 38. To operate the manual engagement lever 38, the user pulls the release mechanism 40, whereon the manual engagement lever 38 can be operated one hundred eighty degrees, which causes the manual engagement mechanism to fully engage or release the first threaded drive shaft 26 and the second threaded drive shaft 28. If necessary, the hand-operated wheel 30 can be rotated slightly as the manual engagement lever 38 is fully operated.

The manual engagement lever 38 is connected to a first cam-engaging shaft 42 that extends below the first threaded drive shaft 26 and the second threaded drive shaft 28, and is thus not visible in FIGS. 1-5, but is visible in FIGS. 13-14, which show perspective views of the assembly of the traveling block 24. The manual engagement lever 38 is connected to the first cam-engaging shaft at a pivot point 44, around which the manual engagement lever 38 rotates as it is operated. Because the manual engagement lever 38 is attached to the traveling block 24, it travels linearly with the traveling block 24. Additionally, because the manual engagement lever 38 is attached to the traveling block 24 and protrudes from the first side panel 12 of the actuator 10 to a position that is readily visible, a position indicator 46 may be associated therewith, which may indicate valve position on a position scale 48 (see FIGS. 6-8) affixed to an external surface of the first side panel 12 above a slot 50 through which the manual engagement lever 38 and/or the first cam-engaging shaft 42 protrudes.

Figure 15:
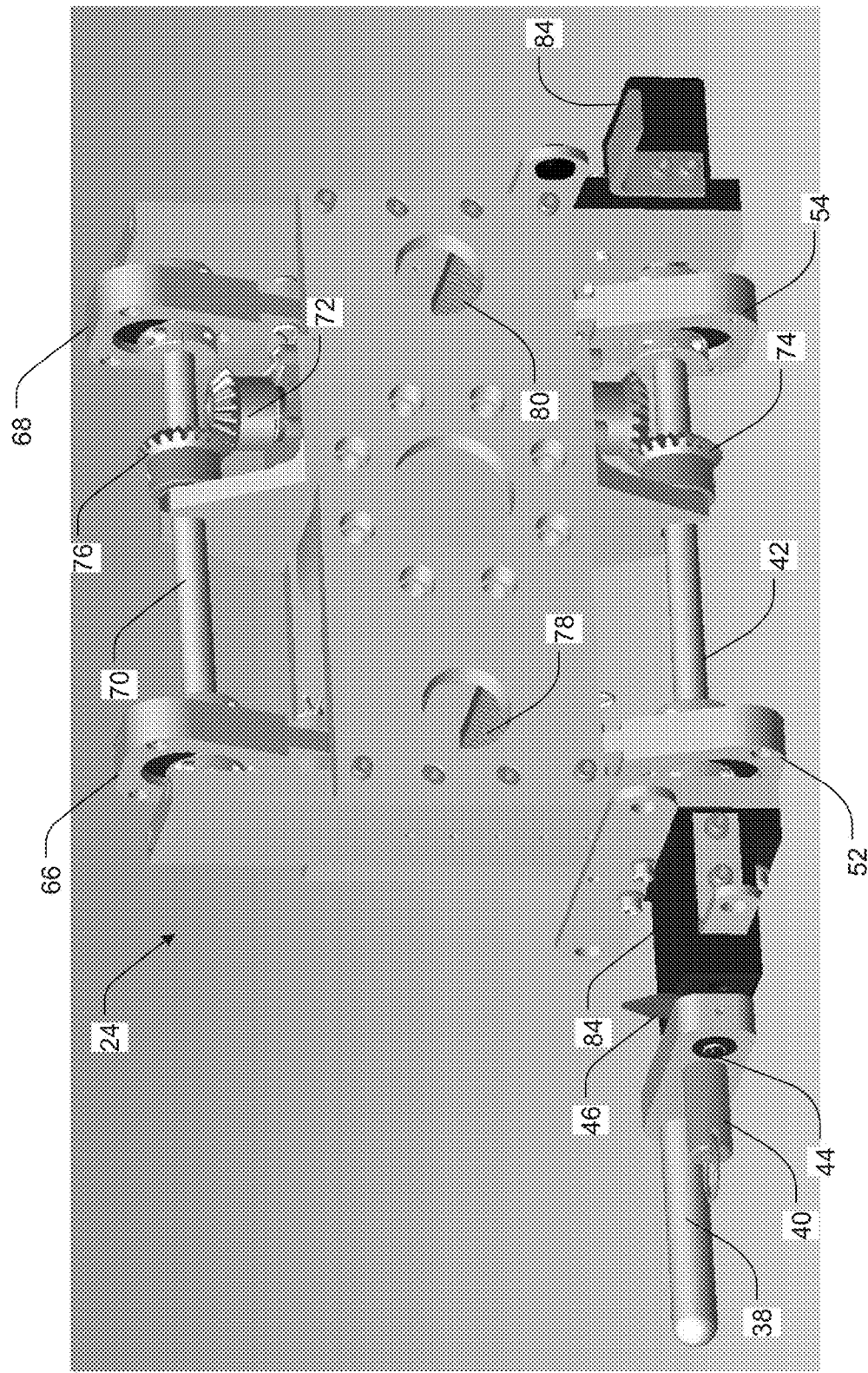
FIG. 15 shows a perspective view of an alternate traveling block assembly of the actuator of FIG. 1.
Figure 16:
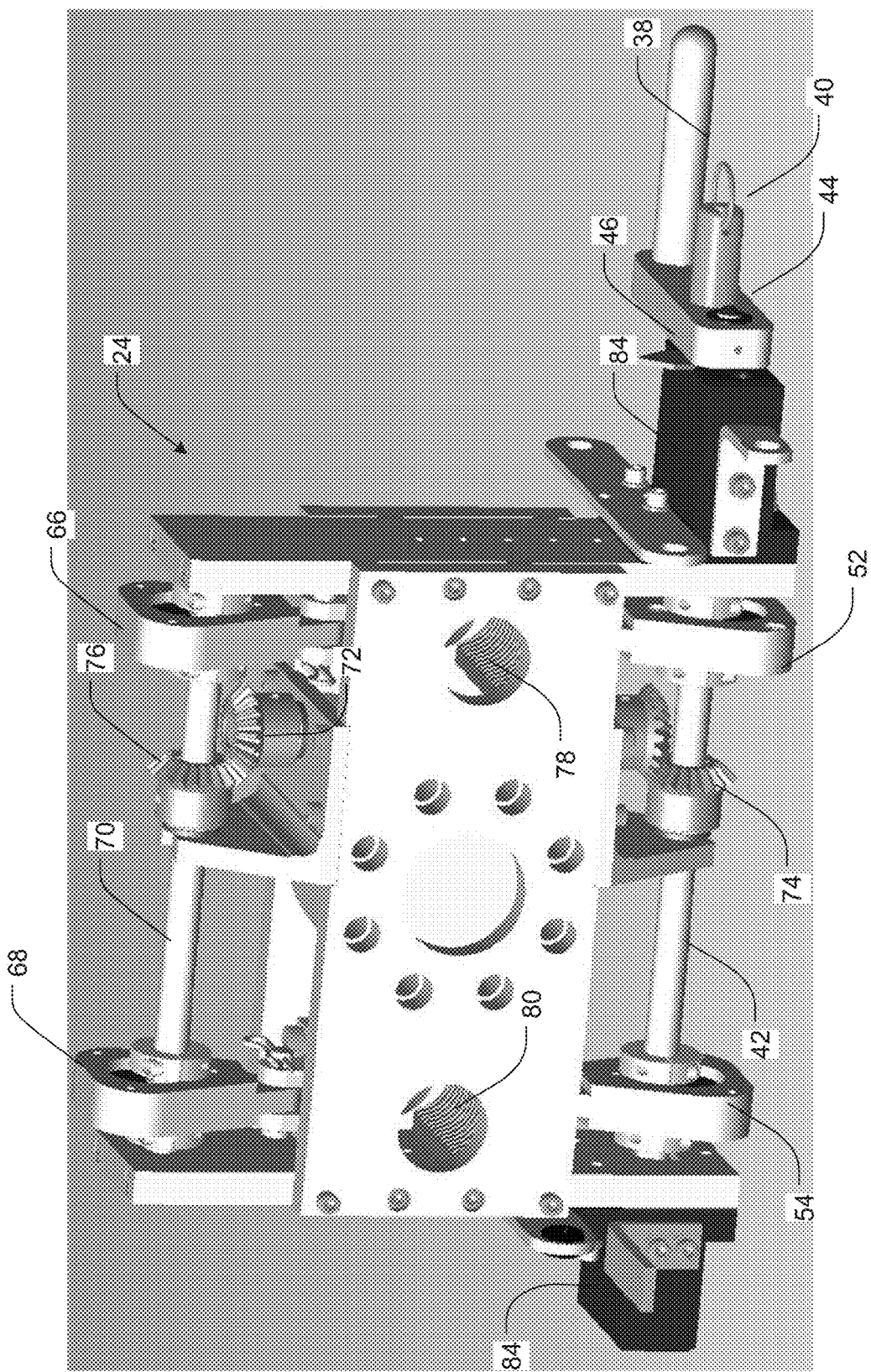
FIG. 16 shows another perspective view of the traveling block assembly of FIG. 15.
Figure 17:
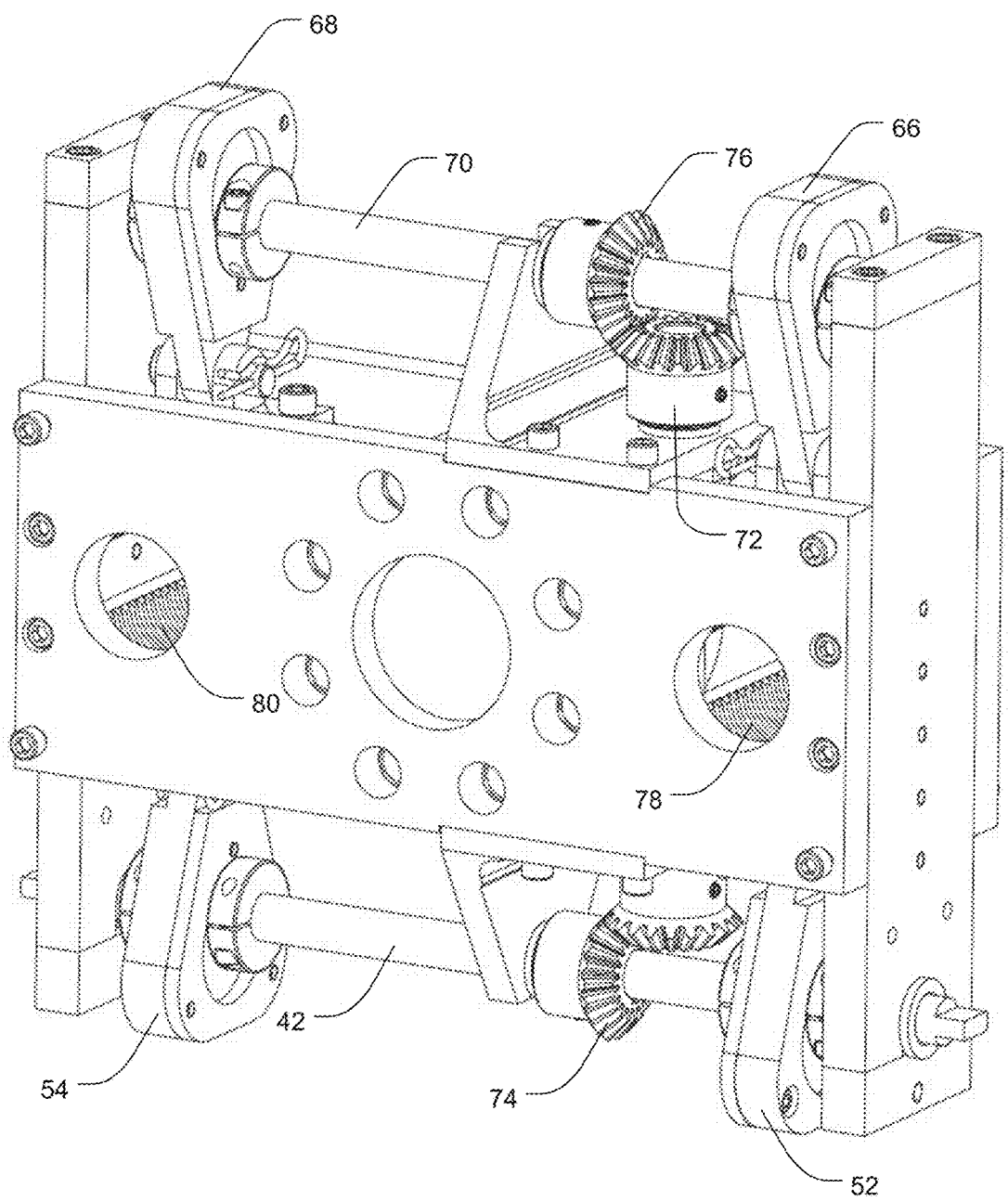
FIG. 17 shows a perspective view of a portion of the traveling block assembly of FIG. 15.
Figure 18:
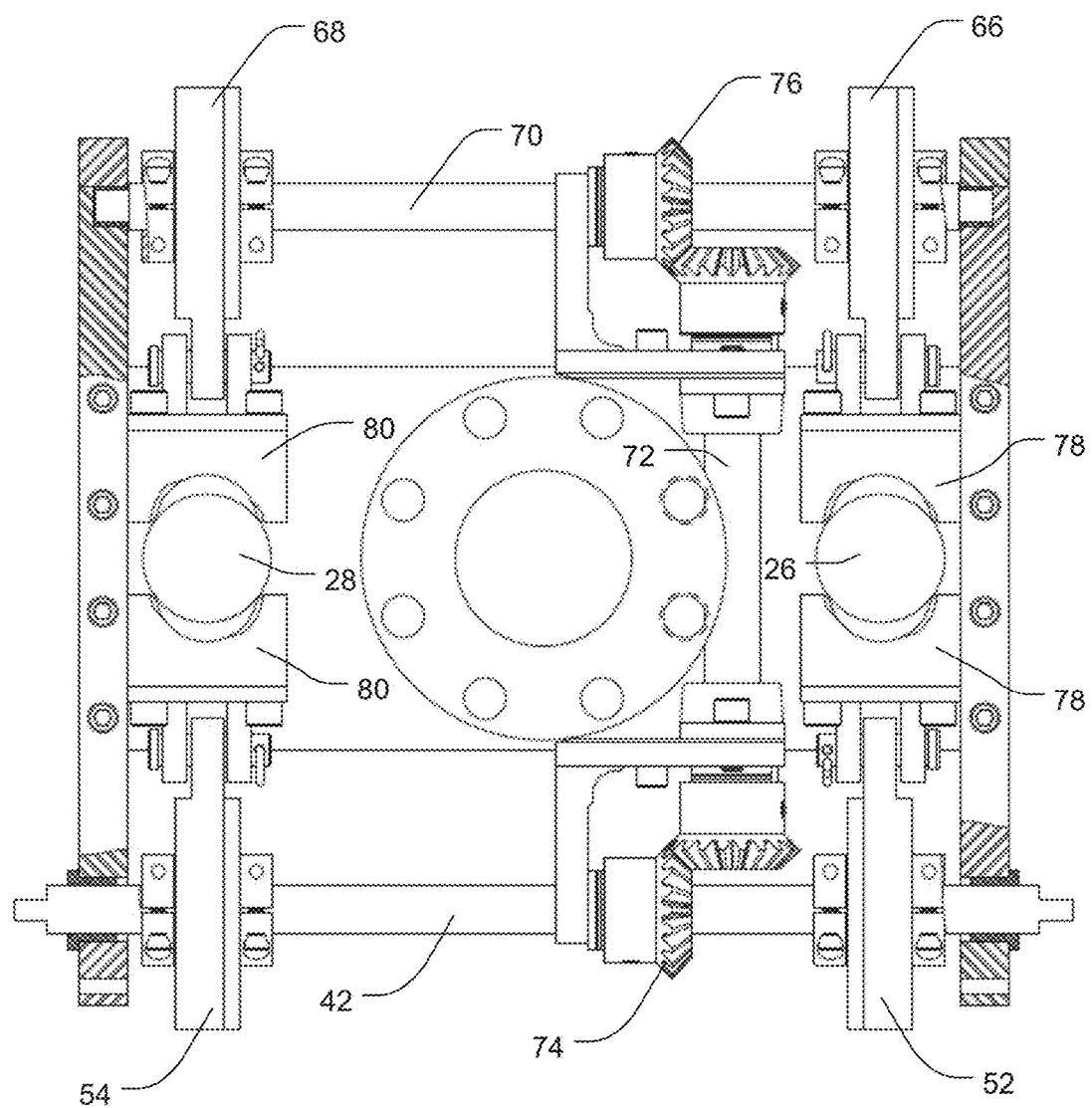
FIG. 18 shows a front view of a portion of the traveling block assembly of FIG. 15 showing internal components normally obscured by a frame plate.
Figure 19:
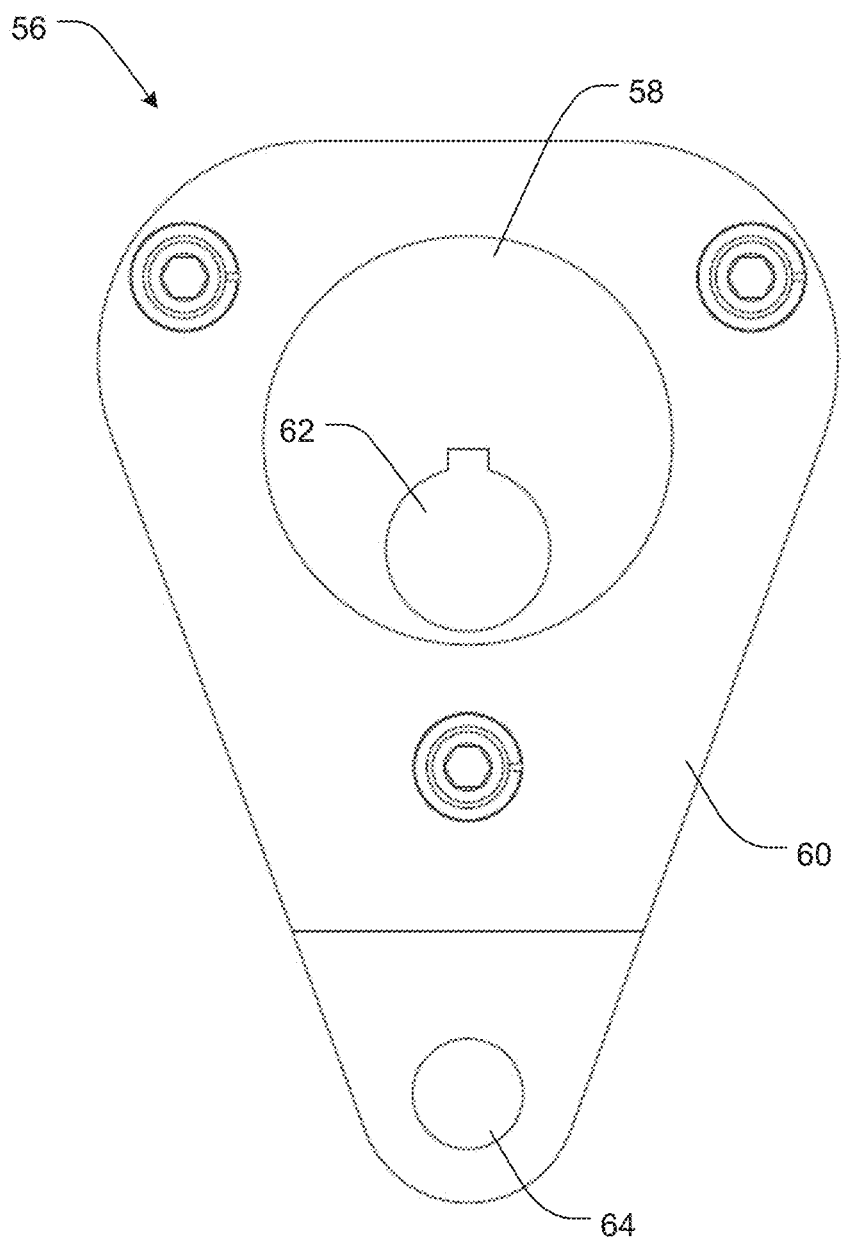
FIG. 19 shows a front view of an illustrative cam assembly in a disengaged position.
Figure 20:
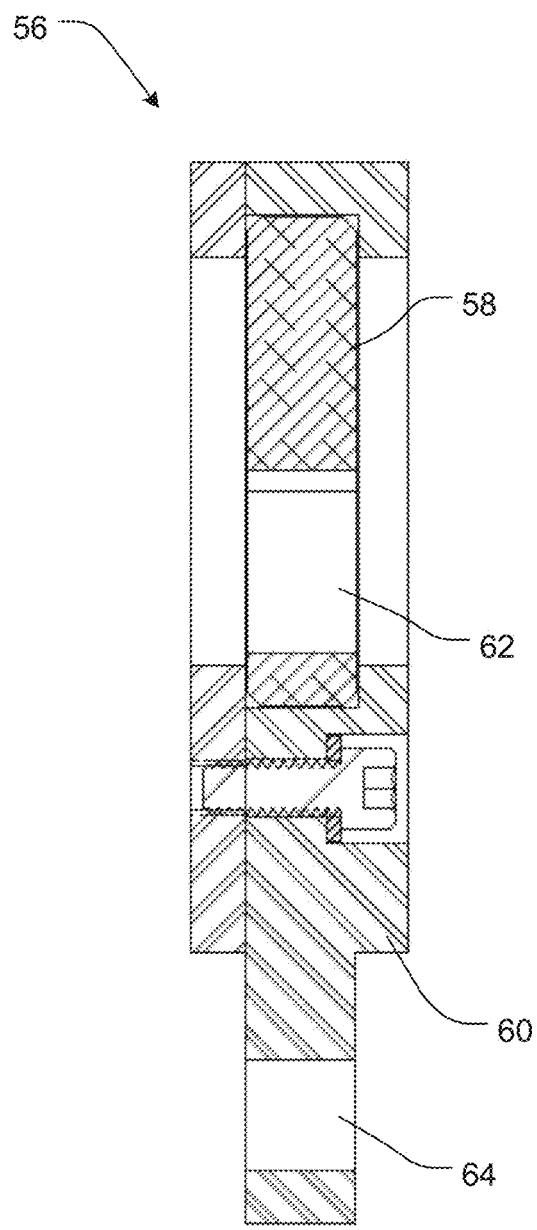
FIG. 20 shows a cross-sectional view of the illustrative cam assembly of FIG. 19 in the disengaged position.
Figure 21:
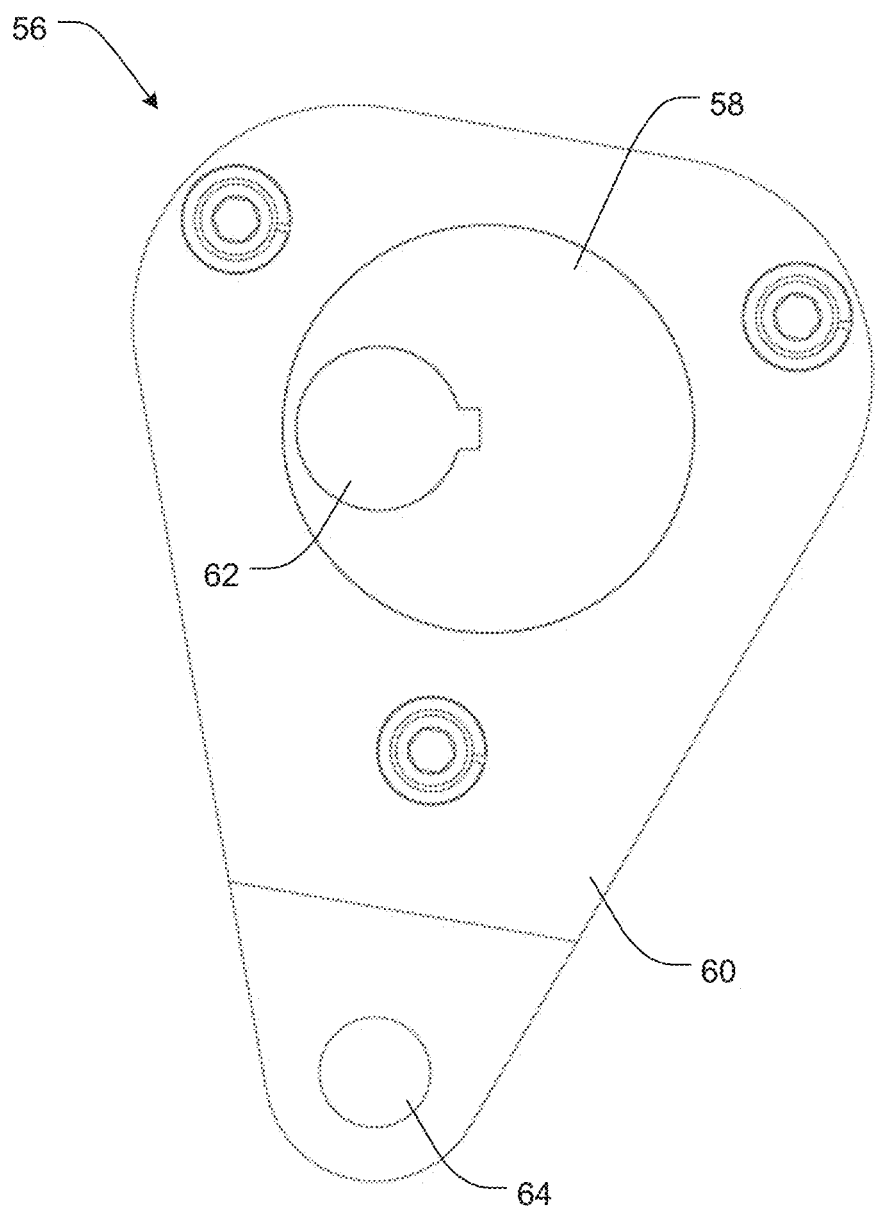
FIG. 21 shows a front view of the illustrative cam assembly of FIG. 19 in an intermediate position between the disengaged position of FIG. 19 and an engaged position of FIG. 22.
Figure 22:
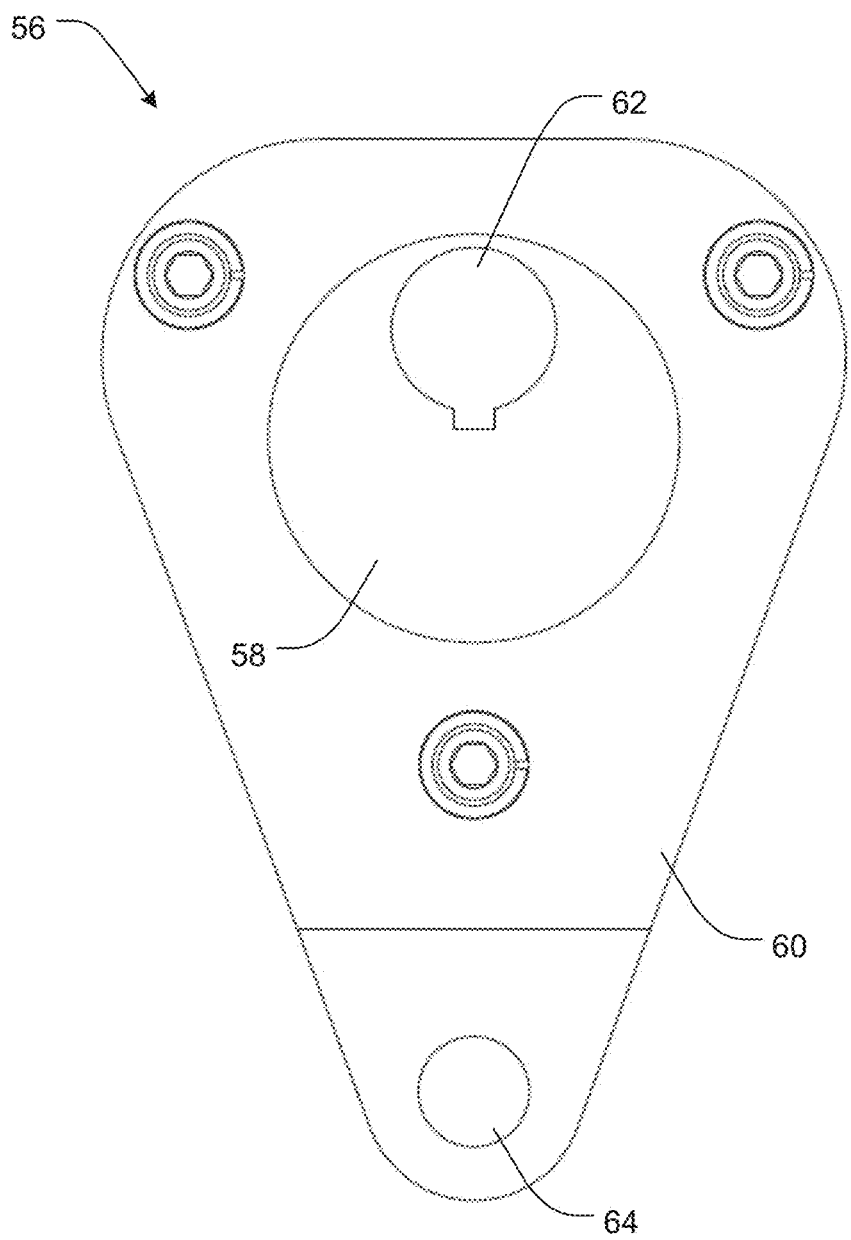
FIG. 22 shows a front view of the illustrative cam assembly of FIG. 19 in the engaged position.

The first cam-engaging shaft 42 extends across the traveling block 24 on a first side (e.g. "below" as oriented in the drawings) of the first threaded drive shaft 26 and the second threaded drive shaft 28. The first cam-engaging shaft 42 passes through a first cam assembly 52 immediately below the first threaded drive shaft 26. The first cam-engaging shaft 42 also passes through a second cam assembly 54 immediately below the second threaded drive shaft 28. FIGS. 15-18 illustrate one illustrative cam assembly 56 (all cam assemblies are identical, though may be oriented differently). FIG. 15 illustrates a side view of one illustrative cam assembly 56 in an orientation in which the traveling block 24 is disengaged from the first threaded drive shaft 26 and the second threaded drive shaft 28. FIG. 16 illustrates a cross-sectional view of the illustrative cam assembly 56 and position of FIG. 15, taken vertically down the center perpendicular to the plane of the view of FIG. 15. FIG. 17 illustrates a side view of the illustrative cam assembly 56 in an intermediate position between full engagement and full disengagement (e.g., when the manual engagement lever 38 has been operated ninety degrees). FIG. 18 illustrates a side view of the illustrative cam assembly 56 in an orientation in which the traveling block 24 is fully engaged with the first threaded drive shaft 26 or the second threaded drive shaft 28.

The cam assembly 56 includes a cam 58 mounted in a cam follower assembly 60. The cam 58 includes a keyway 62 that receives a cam-engaging shaft (e.g. the first cam-engaging shaft 42). In the illustrated embodiment, the keyway 62 includes a generally circular shape with a single protrusion that engages with the cam-engaging shaft and ensures that the cam 58 rotates with the cam-engaging shaft. It should be understood, however, that the keyway 62 and the accompanying cam-engaging shaft may have any corresponding and force-transferring shape desired. As FIG. 16 illustrates, the cam follower assembly 60 encompasses the cam 56 in a cylindrical cavity. Because the keyway 62 is offset from the center of the cam 58, as the cam-engaging shaft and the cam 58 rotate, the cam follower assembly 60 is displaced, thereby translating the rotational motion of the cam-engaging shaft into linear motion of a cam follower (not shown) affixed to a pivot 64 of the cam follower assembly 60, as illustrated by FIGS. 15, 17, and 18. The other end of the cam follower is affixed to half of a split nut or jaw block, as will be discussed in more detail below.

In the following discussion, directional references are to the orientation in the drawings of FIGS. 15-18, and it should be understood that the frame of reference can be changed according to the final orientation of the actuator 10 in use.

In the position of FIG. 15, the keyway 62 is most proximate to the pivot 64, and the traveling block 24 is disengaged from the respective threaded drive shaft, as the half of the split nut is spaced apart from the threads of the threaded drive shaft. As the cam-engaging shaft is turned approximately ninety degrees, the keyway 62 is approximately in the position shown in FIG. 17. Because the pivot 64 cannot move side-to-side, and because the cam-engaging shaft is also fixed against side-to-side or upward-or-downward movement, the upper portion of the cam follower assembly 60 is forced to the side and downward, which causes some downward movement of the pivot 64, the cam follower, and the half of the split nut attached to the cam follower. As the rotation of the cam-engaging shaft is completed to approximately one hundred eighty degrees from the position of FIG. 15, as illustrated in FIG. 18, the keyway is at its most-distal point from the pivot 64. The upper portion of the cam follower assembly 60 has moved back to its central position relative to the cam-engaging shaft, and the pivot 64, the cam follower, and the half of the split nut attached to the cam follower have all been forced downward to their maximal extent, where threads of the half of the split nut engage the threads of the threaded drive shaft.

This engagement with the threaded drive shaft is very secure, because the half of the split nut has moved only linearly, and because the half of the split nut is very strongly secured against movement away from the threaded drive shaft by the assembly of the cam follower, cam, and cam-engaging shaft, and because the cam-engaging shaft is fixed against outward (from the threaded drive shaft) movement by its position in cavities in walls of the traveling block 24. The engagement between the halves of the split nut and the threaded drive shafts is even more secure in that a similar engagement occurs simultaneously on both sides of the threaded drive shafts.

Figure 13:
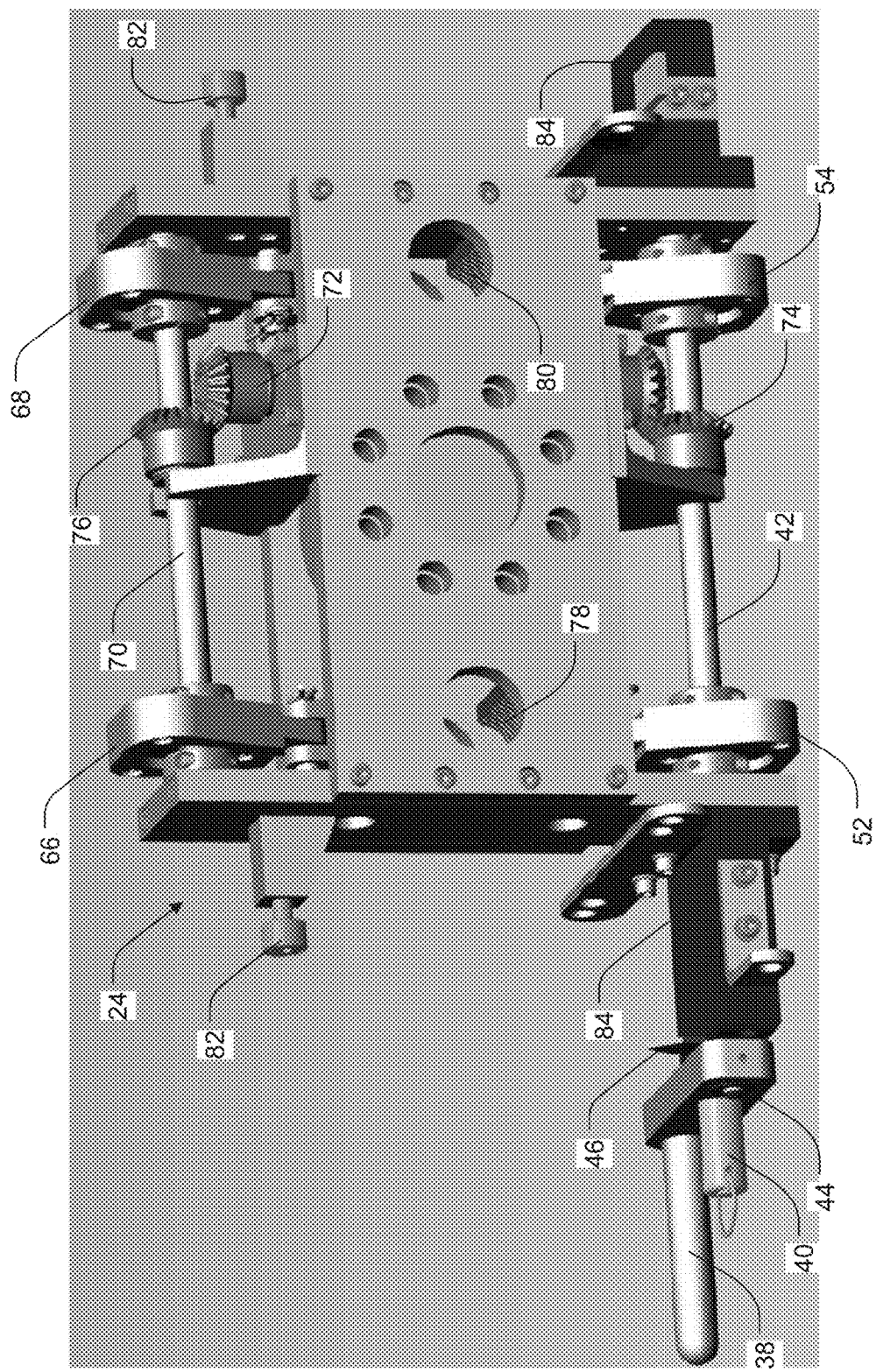
FIG. 13 shows a perspective view of a traveling block assembly of the actuator of FIG. 1.
Figure 14:
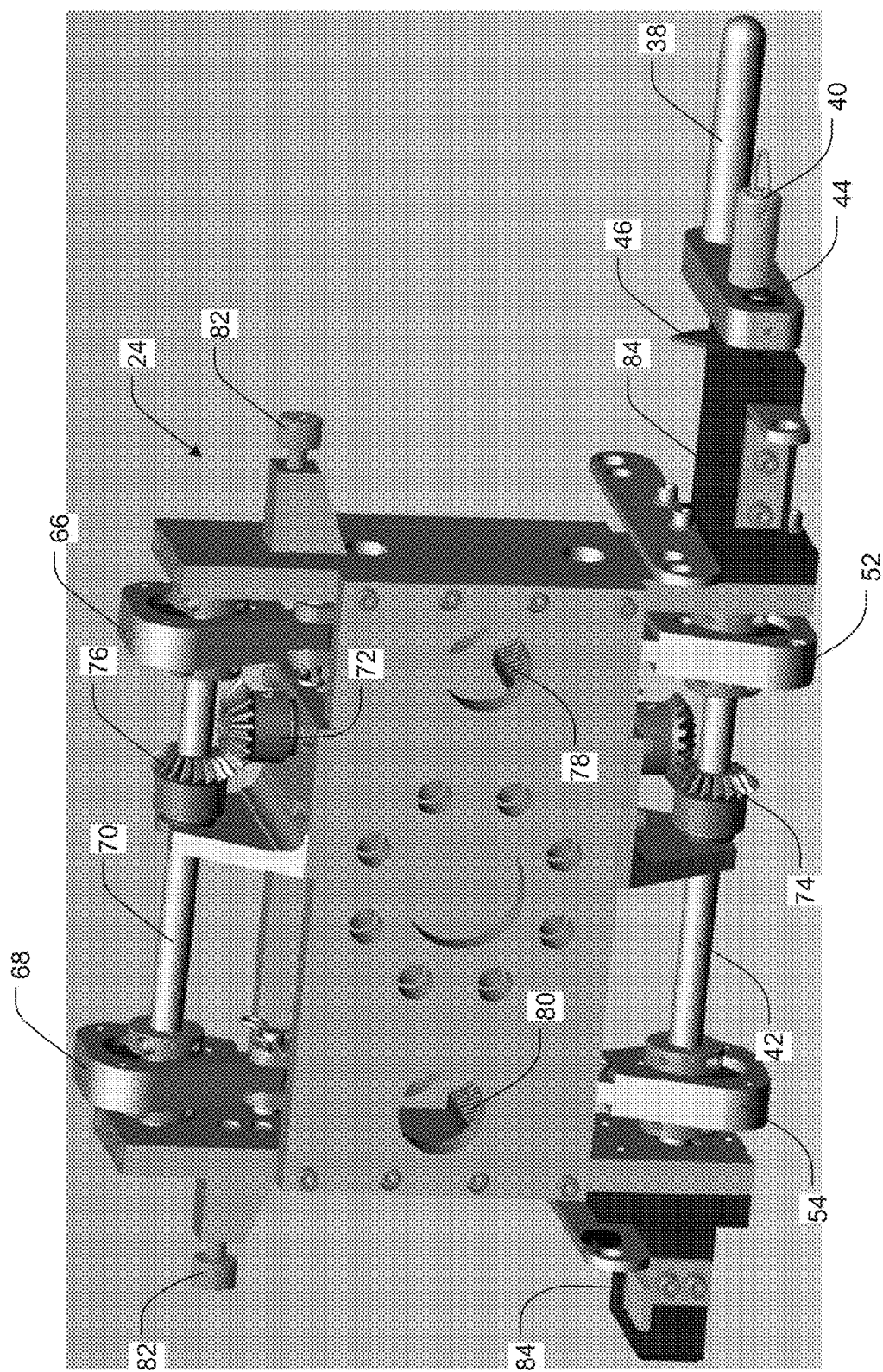
FIG. 14 shows another perspective view of the traveling block assembly of FIG. 13.

To achieve engagement of the threaded drive shafts on both sides at once without requiring operation of two manual engagement mechanisms, the traveling block includes a third cam assembly 66 and a fourth cam assembly 68 operatively engaged with a second cam-engaging shaft 70, as shown in FIGS. 13 and 14. The third cam assembly 66 and the fourth cam assembly 68 are substantially similar to the illustrative cam assembly 56 illustrated in FIGS. 15-18, discussed above. The third cam assembly 66 and the fourth cam assembly 68 are each attached to cam followers (not shown) and their own halves of the split nuts or jaw blocks, these all being located on the second side (e.g., above in FIGS. 13 and 14) of the first threaded drive shaft 26 and the second threaded drive shaft 28.

So that the various cam assemblies can operate in concert, the first cam-engaging shaft 42 and the second cam-engaging shaft 70 are operatively linked by a linking shaft 72 that extends between the first cam-engaging shaft 42 and the second cam-engaging shaft 70 (e.g., vertically in FIGS. 13 and 14). Rotation of the first cam-engaging shaft 42 around a horizontal axis is transferred to rotation of the linking shaft 72 around a vertical axis by a first set of bevel gears 74. Similarly, rotation of the linking shaft 72 around the vertical axis is transferred to rotation of the second cam-engaging shaft 70 around a horizontal axis (parallel to the axis of rotation of the first cam-engaging shaft 42) by a second set of bevel gears 76. Accordingly, the first cam-engaging shaft 42 and the second cam-engaging shaft are made to rotate in concert, such that the two halves of each split nut engage around their respective threaded drive shafts in concert. Thus, a first split nut 78 with one half actuated by the first cam assembly 52 and the other half actuated by the third cam assembly 66 is moved with the two halves moving linearly together to encompass and engage the first threaded drive shaft 26. Similarly, a second split nut 80 with one half actuated by the second cam assembly 54 and the other half actuated by the fourth cam assembly 68 is moved with the two halves moving linearly together to encompass and engage the second threaded drive shaft 28. When disengagement is desired, the manual engagement lever 38 is again rotated one hundred eighty degrees, thereby disengaging the halves of the split nuts 78, 80 from the threaded drive shafts 26, 28.

FIGS. 13 and 14 illustrate additional features of the traveling block 24 and/or the traveling block assembly that may be provided to prevent or reduce rotation of the traveling block 24 in the actuator 10. One optional feature that may be included is one or more anti-rotation guide wheels 82 that are adapted to engage with one or more rails disposed on an inner surface of the first side plate 12 and/or the second side plate 14, which may be attached on the inner surface without requiring additional machining of the first side plate 12 and/or the second side plate 14. As another option, the guide wheels 82 may engage with one or more slots machined into an inner surface of the first side plate 12 and/or the second side plate 14. Additionally or alternatively, rotation of the traveling block 24 may be reduced or eliminated by one or more slot-engaging guide tabs 84 that extend into one or more slots in the first side plate 12 and/or the second side plate 14, such as the slot 50, which slots need not necessarily extend fully through the first side plate 12 and/or the second side plate 14, except as desired to permit the position indicator 46 and the manual engagement lever 38 to extend therethrough.

FIGS. 15-18 illustrate an alternate embodiment of the traveling block 24 and/or the traveling block assembly. In this embodiment, the anti-rotation guide wheels 82 are not included, and in this embodiment, rotation is minimized solely by the slot-engaging guide tabs 84. FIGS. 17 and 18 show a sub-portion of the views of FIGS. 15 and 16, and more clearly illustrate features of the traveling block 24 and/or the traveling block assembly. Particularly, the front view of FIG. 18 in which one or more frame plates is omitted for clarity, the two halves of the first split nut 78 and the two halves of the second split nut 80 are clearly visible, as is the entirety of the linking shaft 72. The view of FIG. 18 more clearly illustrates how the first split nut 78 and the second split nut 80 may move to engage or disengage the first threaded drive shaft 26 and the second threaded drive shaft 28.

One additional benefit of the actuator 10 is that various instrumentation of the actuator 10 may be largely or wholly contained within the body of the actuator 10 to reduce the risk of damage from strikes. For example, the actuator 10 illustrated herein is adapted to receive up to four linear-displacement transducers (LDTs) 86 (illustrated in FIGS. 3, 10, and 11) that may be used to report an operating position of the actuator 10 to a control system. Similarly, various limit switches (not shown), such as a hand-wheel engagement limit switch, an open limit switch, and/or a closed limit switch may all be contained within the body of the actuator and thus protected from damage.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An actuator for a fluid catalytic cracking unit slide valve, comprising:
   a hand-operated wheel operatively connected to a threaded drive shaft such that turning the hand-operated wheel causes the threaded drive shaft to rotate;
   a traveling block having an engagement system encompassing the threaded drive shaft, the traveling block comprising:
      a manual engagement lever;
      a first engagement shaft extending from the manual engagement lever on a first side of the threaded drive shaft, the first engagement shaft being operatively engaged with a first cam;
      a second engagement shaft extending substantially parallel to the first engagement shaft on a second side of the threaded drive shaft, the second engagement shaft being operatively engaged with a second cam;
      an engagement shaft linkage extending between the first engagement shaft and the second engagement shaft and being operative to translate a rotation of the first engagement shaft into a coordinated rotation of the second engagement shaft;
      a split nut comprising:
         a first half disposed in the traveling block on the first side of the threaded drive shaft; and
         a second half disposed in the traveling block on the second side of the threaded drive shaft;
      a first cam follower extending from the first cam to the first half of the split nut; and
      a second cam follower extending from the second cam to the second half of the split nut;
   whereby operating the manual engagement lever causes the first engagement shaft and the second engagement shaft to rotate, operating the first cam and the second cam to force the first half of the split nut and the second half of the split nut together around the threaded drive shaft or to release the first half of the split nut and the second half of the split nut from the threaded drive shaft.

2. The actuator as recited in claim 1, wherein the engagement shaft linkage comprises:
   a linkage shaft extending between the first engagement shaft and the second engagement shaft;
   a first bevel gear translating rotational motion of the first engagement shaft into rotational motion of the linkage shaft; and
   a second bevel gear translating rotational motion of the linkage shaft into rotational motion of the second engagement shaft.

3. The actuator as recited in claim 1, wherein the first half and the second half of the split nut each comprise a threaded contact surface adapted to engage with a thread of the threaded drive shaft.

4. The actuator as recited in claim 1, wherein the first half of the split nut and the second half of the split nut move substantially linearly toward and away from each other without rotating relative to each other.

5. The actuator as recited in claim 1, wherein the manual engagement lever is directly coupled to the first engagement shaft, whereby the manual engagement lever rotates around an axis of the first engagement shaft.

6. The actuator as recited in claim 1, wherein the threaded drive shaft is a first threaded drive shaft, the actuator further comprising:
   a second threaded drive shaft operatively connected to the hand-operated wheel such that turning the hand-operated wheel causes the second threaded drive shaft to rotate;
   a third cam operatively engaged with the first engagement shaft and linked by a third cam follower to a first half of an additional split nut located on a first side of the second threaded drive shaft; and
   a fourth cam operatively engaged with the second engagement shaft and linked by a fourth cam follower to a second half of the additional split nut located on a second side of the second threaded drive shaft;
   whereby operating the manual engagement lever and causing the first engagement shaft and the second engagement shaft to rotate, operates the third cam and the fourth cam to force the first half of the additional split nut and the second half of the additional split nut together around the second threaded drive shaft or to release the first half of the additional split nut and the second half of the additional split nut from the second threaded drive shaft.

7. The actuator as recited in claim 1, further comprising:
   a first side plate;
   a second side plate;
   a first end plate bolted to the first side plate and the second side plate; and
   a second end plate bolted to the first side plate and the second side plate;
   whereby any of the first side plate, the second side plate, the first end plate, or the second end plate is configured to be individually replaced.

8. The actuator as recited in claim 7, further comprising a side plate slot disposed on one of the first side plate or the second side plate, the side plate slot serving to reduce rotation of the traveling block relative to the side plates.

9. The actuator as recited in claim 7, wherein instrumentation for the actuator is disposed within a volume defined by the first and second side plates and the first and second end plates.

10. The actuator as recited in claim 9, wherein the instrumentation disposed within the volume defined by the first and second side plates and the first and second end plates comprises instrumentation selected from the group consisting of:
    a linear-displacement transducer;
    a hand-wheel engagement limit switch;
    an open limit switch; and
    a closed limit switch.

11. The actuator as recited in claim 1, further comprising a piston rod attached to one side of the traveling block and a valve stem attached to an opposing side of the traveling block.

12. An actuator for a fluid catalytic cracking unit slide valve, comprising:
    a hand-operated wheel operatively connected to a first threaded drive shaft and a second threaded drive shaft such that turning the hand-operated wheel causes the first threaded drive shaft and the second threaded drive shaft to rotate;
    a traveling block having an engagement system encompassing the first threaded drive shaft and the second threaded drive shaft, the traveling block comprising:
       a manual engagement lever;
       a first engagement shaft extending from the manual engagement lever on a first side of the first threaded drive shaft, the first engagement shaft being operatively engaged with a first cam and a second cam;

a second engagement shaft extending substantially parallel to the first engagement shaft on a second side of the second threaded drive shaft, the second engagement shaft being operatively engaged with a third cam and a fourth cam;

an engagement shaft linkage extending between the first engagement shaft and the second engagement shaft and being operative to translate a rotation of the first engagement shaft into a coordinated rotation of the second engagement shaft;

a first split nut comprising:
  a first half disposed in the traveling block on the first side of the first threaded drive shaft; and
  a second half disposed in the traveling block on the second side of the first threaded drive shaft;

a second split nut comprising:
  a first half disposed in the traveling block on the first side of the second threaded drive shaft; and
  a second half disposed in the traveling block on the second side of the second threaded drive shaft;

a first cam follower extending from the first cam to the first half of the first split nut;

a second cam follower extending from the third cam to the second half of the first split nut;

a third cam follower extending from the second cam to the first half of the second split nut; and a fourth cam follower extending from the fourth cam to the second half of the second split nut;

whereby operating the manual engagement lever causes the first engagement shaft and the second engagement shaft to rotate, operating the first, second, third, and fourth cams to force the first half of each of the first split nut and the second split nut and the second half of each of the first split nut and the second split nut together around the first threaded drive shaft and the second threaded drive shaft or to release the first half of the first split nut and the second half of the first split nut and the second split nut from the first and second threaded drive shafts.

13. The actuator as recited in claim 12, wherein the engagement shaft linkage comprises:
  a linkage shaft extending between the first engagement shaft and the second engagement shaft;
  a first bevel gear translating rotational motion of the first engagement shaft into rotational motion of the linkage shaft; and
  a second bevel gear translating rotational motion of the linkage shaft into rotational motion of the second engagement shaft.

14. The actuator as recited in claim 12, wherein the first half and the second half of each split nut each comprise a threaded contact surface adapted to engage with a thread of the respective threaded drive shaft.

15. The actuator as recited in claim 12, wherein the first half of each split nut and the second half of each split nut move substantially linearly toward and away from each other without rotating relative to each other.

16. The actuator as recited in claim 12, wherein the manual engagement lever is directly coupled to the first engagement shaft, whereby the manual engagement lever rotates around an axis of the first engagement shaft.

17. The actuator as recited in claim 12, further comprising a piston rod attached to one side of the traveling block and a valve stem attached to an opposing side of the traveling block.

18. The actuator as recited in claim 12, further comprising:

a first side plate;
a second side plate;
a first end plate bolted to the first side plate and the second side plate; and
a second end plate bolted to the first side plate and the second side plate;
whereby any of the first side plate, the second side plate, the first end plate, or the second end plate is configured to be individually replaced.

19. An actuator for a fluid catalytic cracking unit slide valve, comprising:
  a first side plate;
  a second side plate;
  a first end plate bolted to the first side plate and the second side plate; and
  a second end plate bolted to the first side plate and the second side plate;
  a hand-operated wheel operatively connected to a first threaded drive shaft and a second threaded drive shaft such that turning the hand-operated wheel causes the first threaded drive shaft and the second threaded drive shaft to rotate;
  a traveling block having an engagement system encompassing the first threaded drive shaft and the second threaded drive shaft, the traveling block comprising:
    a manual engagement lever;
    a first engagement shaft extending from the manual engagement lever on a first side of the first threaded drive shaft and on a first side of the second threaded drive shaft, the first engagement shaft being operatively engaged with a first cam and a second cam;
    a second engagement shaft extending substantially parallel to the first engagement shaft on a second side of the first threaded drive shaft and on a second side of the second threaded drive shaft, the second engagement shaft being operatively engaged with a third cam and a fourth cam;
    an engagement shaft linkage extending between the first engagement shaft and the second engagement shaft and being operative to translate a rotation of the first engagement shaft into a coordinated rotation of the second engagement shaft;
    a first split nut comprising:
      a first half disposed in the traveling block on the first side of the first threaded drive shaft; and
      a second half disposed in the traveling block on the second side of the first threaded drive shaft;
    a second split nut comprising:
      a first half disposed in the traveling block on the first side of the second threaded drive shaft; and
      a second half disposed in the traveling block on the second side of the second threaded drive shaft;
    a first cam follower extending from the first cam to the first half of the first split nut; and
    a second cam follower extending from the third cam to the second half of the first split nut;
    a third cam follower extending from the second cam to the first half of the second split nut; and
    a fourth cam follower extending from the fourth cam to the second half of the second split nut;
  whereby operating the manual engagement lever causes the first engagement shaft and the second engagement shaft to rotate, operating the first, second, third, and fourth cams to force the first half and the second half of the first split nut together around the first threaded drive shaft and to force the first half and the second half of the second split nut together around the second threaded drive shaft or to release the first half and the second half of the respective split nuts from the respective threaded drive shafts.

20. The actuator as recited in claim 19, wherein the engagement shaft linkage comprises:
   a linkage shaft extending between the first engagement shaft and the second engagement shaft;
   a first bevel gear translating rotational motion of the first engagement shaft into rotational motion of the linkage shaft; and
   a second bevel gear translating rotational motion of the linkage shaft into rotational motion of the second engagement shaft.

* * * * *